US011088645B2

(12) United States Patent
Suzuki

(10) Patent No.: US 11,088,645 B2
(45) Date of Patent: Aug. 10, 2021

(54) CONTROL DEVICE OF MULTI-PHASE ROTATING MACHINE

(71) Applicant: DENSO CORPORATION, Kariya (JP)

(72) Inventor: Takashi Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/882,976

(22) Filed: May 26, 2020

(65) Prior Publication Data
US 2020/0382040 A1 Dec. 3, 2020

(30) Foreign Application Priority Data

May 29, 2019 (JP) .............................. JP2019-100618

(51) Int. Cl.
| | | |
|---|---|---|
| *H02P 1/46* | (2006.01) |
| *H02P 1/50* | (2006.01) |
| *H02P 3/18* | (2006.01) |
| *H02P 25/22* | (2006.01) |
| *H02P 25/30* | (2006.01) |

(Continued)

(52) U.S. Cl.
CPC ............ *H02P 25/22* (2013.01); *B62D 5/0463* (2013.01); *H02P 21/22* (2016.02); *H02P 25/30* (2013.01)

(58) Field of Classification Search
CPC .......... H02P 25/22; H02P 21/22; H02P 25/30; B62D 5/0463
USPC ....................................................... 318/724
See application file for complete search history.

(56) References Cited

U.S. PATENT DOCUMENTS

| | | | | |
|---|---|---|---|---|
| 7,439,697 B2 * | 10/2008 | Miyazaki | .......... | H02M 7/53875 |
| | | | | 318/400.41 |
| 8,952,637 B2 * | 2/2015 | Suzuki | .................... | H02P 25/22 |
| | | | | 318/400.01 |
| 2003/0085683 A1 | 5/2003 | Satake et al. | | |

(Continued)

FOREIGN PATENT DOCUMENTS

| | | |
|---|---|---|
| JP | 2018-121428 A | 8/2018 |
| JP | 6497106 B2 | 3/2019 |

OTHER PUBLICATIONS

Kondo et al., "A Designing Method in Current Control System of Permanent Magnet Synchronous Motor for Railway Vehicle Traction", T.IEE Japan, vol. 118-D, 7/8, '98, p. 900-907.

*Primary Examiner* — Erick D Glass
(74) *Attorney, Agent, or Firm* — Maschoff Brennan

(57) ABSTRACT

Two systems of individually-provided arithmetic units in a control device of a multi-phase rotating machine perform control calculation for a control of electric current flowing from power converters to the multi-phase windings. The arithmetic units of the respective systems communicate information via inter-system communication at least in one direction, and perform current control calculation of the electric current flowing in the multi-phase windings of a subject system in a cycle shorter than a communication cycle of the inter-system communication, and calculate a decoupling control amount of the electric current flowing in the multi-phase windings of the subject system, for a decoupling control of a voltage generated in the multi-phase windings of the subject system by the electric current flowing in the multi-phase windings of an other system by using an estimated current that is calculated based on a current instruction value of the subject system or of the other system.

12 Claims, 22 Drawing Sheets

(51) Int. Cl.
*H02P 21/22* (2016.01)
*B62D 5/04* (2006.01)

(56) References Cited

U.S. PATENT DOCUMENTS

| | | |
|---|---|---|
| 2013/0285591 A1 | 10/2013 | Suzuki |
| 2017/0264229 A1* | 9/2017 | Murata ................. B60L 7/003 |
| 2019/0256129 A1 | 8/2019 | Oka et al. |

* cited by examiner

TRANS FUNC OF I* → I_est

TRANS FUNC OF I → I_est

2ND EMBD

OPEN LOOP CHAR $\dfrac{(K_\omega L + K_\omega \frac{R}{s}) \times \frac{1}{R+Ls}}{1 - \frac{G(s)}{1+G(s)} \times \frac{Ms}{R+Ls}}$

COMP EX1

OPEN LOOP CHAR $\dfrac{(K_\omega L + K_\omega \frac{R}{s}) \times \frac{1}{R+Ls}}{1 - \frac{Ms}{R+Ls}}$

COMP EX2

OPEN LOOP CHAR $\dfrac{K_\omega (M+L) + K_\omega \frac{R}{s}}{R+Ls}$

US 11,088,645 B2

CONTROL DEVICE OF MULTI-PHASE ROTATING MACHINE

CROSS REFERENCE TO RELATED APPLICATION

The present application is based on and claims the benefit of priority of Japanese Patent Application No. 2019-100618, filed on May 29, 2019, the disclosure of which is incorporated herein by reference.

TECHNICAL FIELD

The present disclosure generally relates to a control device for a multi-phase rotating machine.

BACKGROUND INFORMATION

In the related art, in a control device for controlling an electric current supplied from a power converter to two systems of multi-phase windings of a double-winding multi-phase rotating machine, a decoupling control calculation has been performed for compensating an interference voltage between the two systems due to magnetic coupling among the windings.

For example, a control device for a multi-winding rotating machine in the related art assumes that the electric currents respectively flowing in two multi-phase windings are substantially the same, and integrates two decoupling control terms. More specifically, by designating two systems as an subject system and an other system while designating a d-axis and a q-axis as one axis and the other, i.e., "partner," axis, the decoupling control term of the other one of the dq-axes in the subject system is integrated with the decoupling control term of the other axis which is the other "partner" axis of the dq-axes in the other system. This control device uses only a post-controller instruction current of the subject system as an input for the decoupling control calculation, thereby simplifying control configuration and reducing calculation load.

The control device of the related art has one arithmetic unit common to (i.e., shared by) the two systems, thus there is no need to consider the communication load between the arithmetic units when obtaining current information (i.e., information of the electric current) of the other system. On the other hand, in a configuration in which two systems of arithmetic units respectively corresponding to the power converters of each of the two systems are separately provided, it is necessary to obtain current information of the other system by communication. When controlling the electric currents of the two systems of multi-phase windings, there is a problem in that the control capacity deteriorates because the communication load between the arithmetic units is high and the control cycle cannot be shortened. Further, if communication between arithmetic units is made faster in order to shorten the arithmetic operation cycle, different problem arises such as an increase of noise to the other circuits due to increase of communications, or communication becoming susceptible to noise.

SUMMARY

It is an object of the present disclosure to provide a control device for a multi-phase rotating machine that reduces communication load in decoupling control by two systems of arithmetic units. An "arithmetic unit" may also be designated as "calculation unit/calculator" hereinafter.

BRIEF DESCRIPTION OF THE DRAWINGS

Objects, features, and advantages of the present disclosure will become more apparent from the following detailed description made with reference to the accompanying drawings, in which.

DETAILED DESCRIPTION

A steering control device according to plural embodiments is described with reference to the drawings. In each embodiment, an electronic control unit or ECU which is provided as a "control device of multi-phase rotating machine" is applied to an electric power steering apparatus of a vehicle, for controlling power supply to a motor (i.e., multi-phase rotating machine) that outputs a steering assist torque. In the following embodiments, substantially same configurations are designated by the same reference numbers thereby to simplify the description. The following first to third embodiments may collectively be referred to as a present embodiment. First, basic configuration shared by the plural respective embodiments is described with reference to FIG. 1 to FIG. 6.

[Configuration of Electric Power Steering Apparatus]

Figure 1:
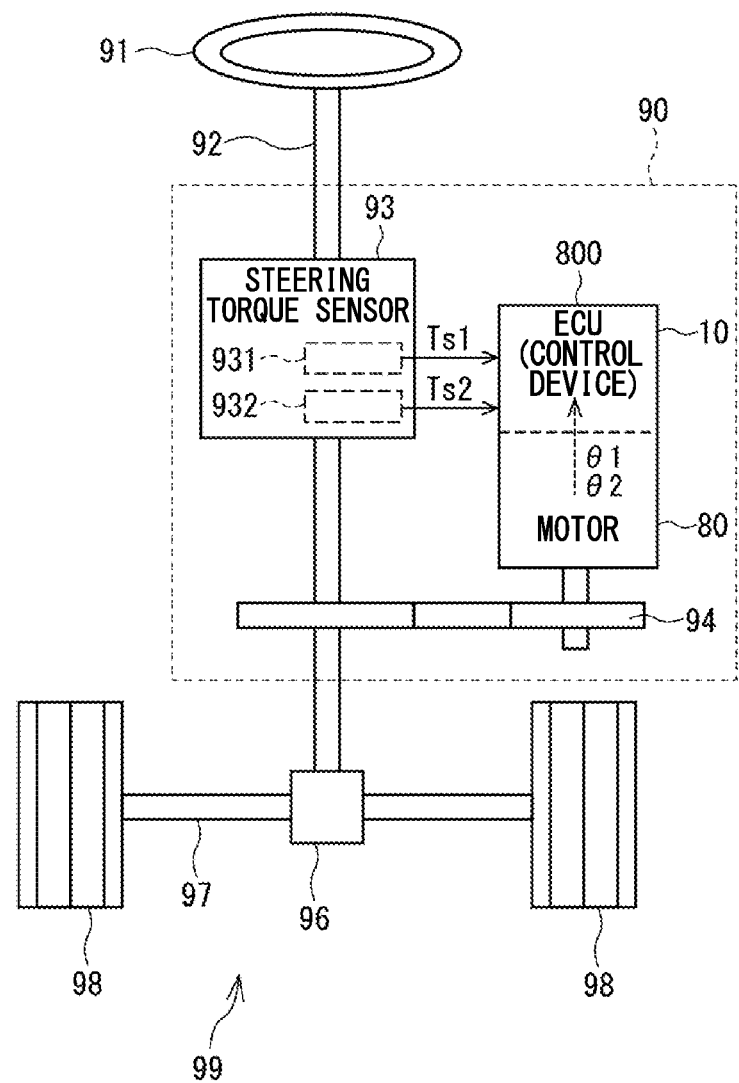
FIG. 1 is a schematic block diagram of an electric power steering apparatus to which a control device according to each of following embodiments is applied.

FIG. 1 shows an overall configuration of a steering system 99 including an electric power steering apparatus 90. FIG. 1 shows a configuration of a machine-electronics circuit integrated type motor 800 in which an electronics control unit or ECU 10 is integrally disposed with a motor 80, on one side thereof in an axial direction of the motor 80. However, the motor 80 may also be a machine-electronics circuit separated type in which the ECU 10 and the motor 80 having separate bodies are connected by a harness. Further, though the electric power steering apparatus 90 shown in FIG. 1 is a column assist type apparatus, the present embodiment may also be applicable to a rack assist type electric power steering apparatus.

The steering system 99 includes a steering wheel 91, a steering shaft 92, a pinion gear 96, a rack shaft 97, road wheels 98, the electric power steering apparatus 90 and the like. The steering shaft 92 is coupled to the steering wheel 91. The pinion gear 96 provided at an axil end of the steering shaft 92 engages with the rack shaft 97. A pair of road wheels 98 are provided at both ends of the rack shaft 97 via, for example, tie rods. When a driver rotates the steering wheel 91, the steering shaft 92 coupled to the steering wheel 91 rotates. A rotational motion of the steering shaft 92 is converted into a linear motion of the rack shaft 97 by the pinion gear 96 and the pair of road wheels 98 is steered to an angle corresponding to a displacement amount of the rack shaft 97.

The electric power steering apparatus 90 includes steering torque sensors 931, 932, the ECU 10, the motor 80, a speed reduction gear 94 and the like. The steering torque sensors 931, 932 are provided redundantly at an intermediate portion of the steering shaft 92 to detect steering torques Ts1, Ts2 exerted by the driver. Based on the steering torques Ts1 and Ts2, the ECU 10 controls driving of the motor 80 so that the motor 80 generates a desired assist torque. The assist torque generated by the motor 80 is transmitted to the steering shaft 92 via the speed reduction gear 94.

Figure 2:
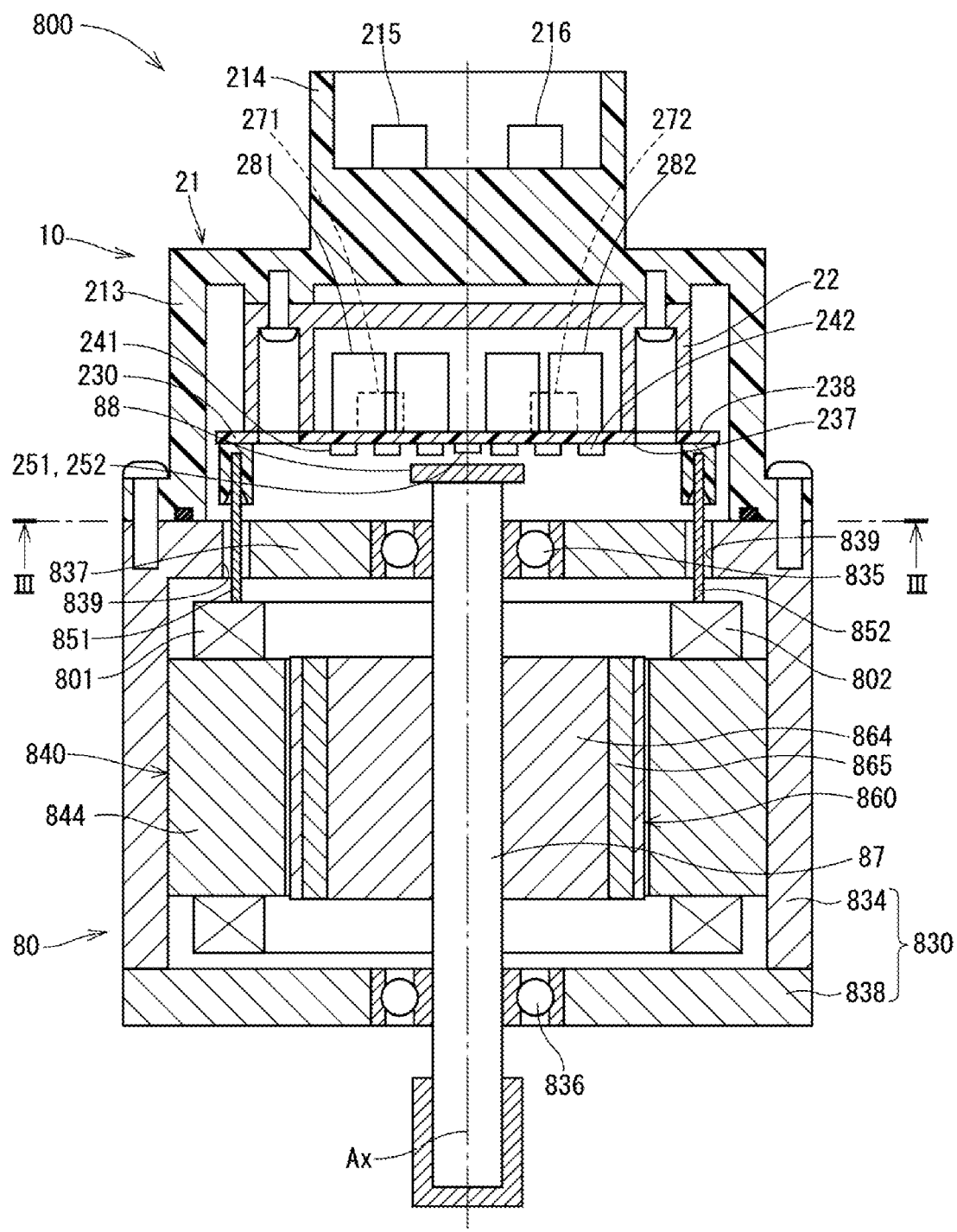
FIG. 2 is an axial cross-sectional view of a two-system machine-electronics circuit integrated type motor.
Figure 3:
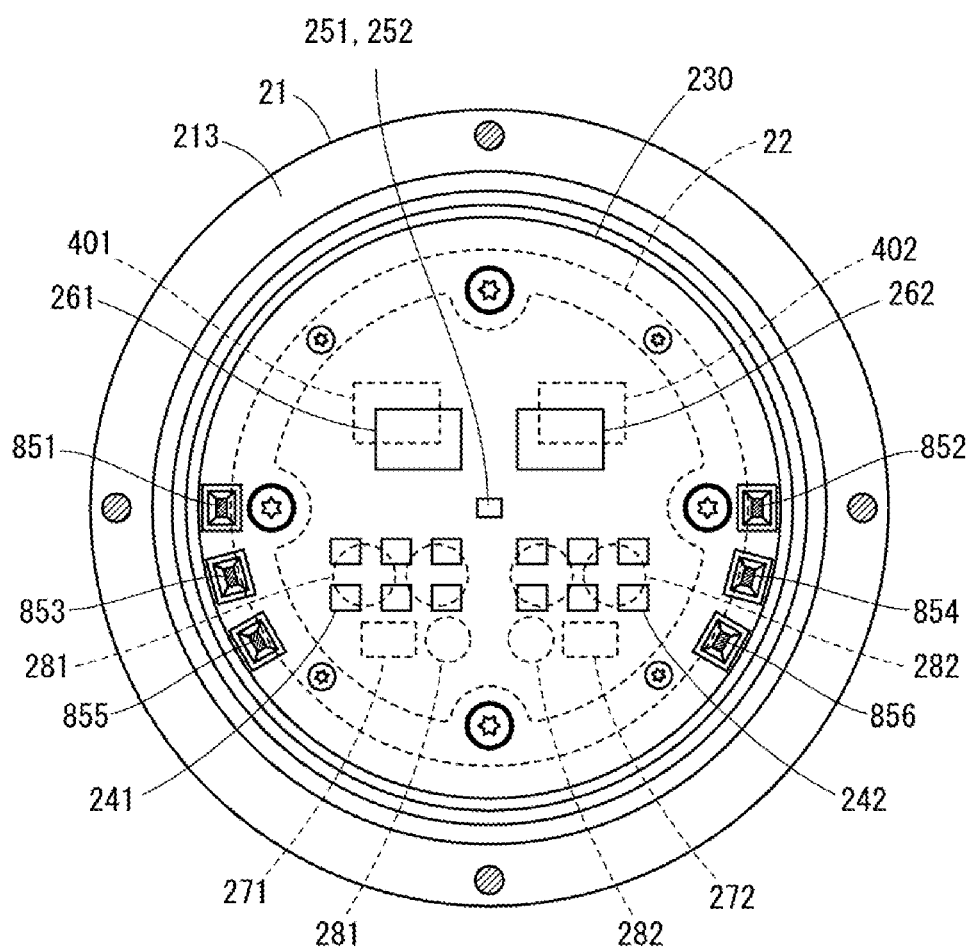
FIG. 3 is a cross-sectional view taken along a line III-III in FIG. 2.

A configuration of the motor 800 of the machine-electronics circuit integrated type in which the ECU 10 is integrally disposed on one side in the axial direction of the motor 80 is described with reference to FIG. 2 and FIG. 3. The ECU 10 as shown in FIG. 2 is positioned coaxially with an axis Ax of a shaft 87 on one side opposite to an output shaft of the motor 80. In other embodiments, the ECU 10 may also be integrally disposed with the motor 80 on the output shaft side of the motor 80. The motor 80 is a three-phase brushless motor which includes a stator 840, a rotor 860 and a housing 830 which houses them.

The stator 840 has a stator core 844 fixed to the housing 830 and two groups of three-phase windings 801, 802 wound in slots 848. Hereinafter, a group of components regarding energization to the three-phase windings 801 and 802 is designated as a "system," which defines a unit of components. The present embodiment thus describes a control device that controls driving of the motor 80 having two systems of three-phase windings 801 and 802. Lead wires 851, 853, and 855 respectively extend from the three-phase winding 801 of a first system. Lead wires 852, 854, and 856 respectively extend from the three-phase winding 802 of a second system.

The rotor 860 has the shaft 87, which is supported by a rear bearing 835 and a front bearing 836, and a rotor core 864, into which the shaft 87 is firmly fitted. The rotor 860 is provided radially inside the stator 840 to be rotatable relative to the stator 840. The motor 80 according to the present embodiment is an embedded magnet type synchronous rotating machine (so-called IPMSM: interior permanent magnet synchronous motor) in which a plurality of magnets 865 are embedded in an outer peripheral portion of the rotor core 864. A permanent magnet 88 used for detecting a rotation angle is provided at one end of the shaft 87.

The housing 830 has a bottomed-cylindrical case 834 including a rear frame end 837, and a front frame end 838, which is provided on one end of the case 834. The case 834 and the front frame end 838 are fastened to each other by bolts or the like. Lead wires 851, 852 and the like of each of the three-phase windings 801, 802 extend through lead wire insertion holes 839 of the rear frame end 837 toward the ECU 10 and are connected to a circuit board 230 of the ECU 10.

The ECU 10 includes a cover 21, a heat sink 22 fixed to the cover 21, the circuit board 230 fixed to the heat sink 22 and other electronic components mounted on the circuit board 230. The cover 21 is provided to protect the electronic components from external impacts and to prevent dust and water from entering into the ECU 10. The cover 21 has a cover portion 213 and an external connection connector portion 214 for connection with external power supply cables and signal cables. Power supply terminals 215 and 216 of the external connection connector portion 214 are connected to the circuit board 230 via a path not shown.

The circuit board 230 is, for example, a printed circuit board and is positioned to face the rear frame end 837 and is fixed to the heat sink 22. On the circuit board 230, the electronic components of the first and second systems are mounted independently for the respective systems so that the two systems are provided in a fully-redundant configuration. In the present embodiment, the circuit board 230 is provided as a single board. However, the circuit board 230 in other embodiments may also be provided as two or more boards. Of two main surfaces of the circuit board 230, a surface facing the rear frame end 837 is referred to as a motor surface 237 and a surface opposite to the motor surface 237, that is, a surface facing the heat sink 22 is referred to as a cover surface 238.

On the motor surface 237, a plurality of switching elements 241, 242, rotation angle sensors 251, 252, custom ICs 261, 262 and the like are mounted. In the present embodiment, there are six switching elements 241, 242 for each system, and form upper and lower arms of three phases of a motor driving circuit. The redundantly-provided rotation angle sensors 251 and 252 are positioned to face the permanent magnet 88 provided at an axial end of the shaft 87. The custom ICs 261, 262 and microcomputers 401, 402 are provided with control circuits of the ECU 10.

On the cover surface 238, the microcomputers 401, 402, capacitors 281, 282, inductors 271, 272 and the like are mounted. In particular, the first microcomputer 401 and the second microcomputer 402 are disposed on the same cover surface 238 of the same circuit board 230 with a predetermined distance interposed therebetween. The capacitors 281 and 282 smoothen an input electric power supplied from a power source, and prevent noise generated and flowing out due to the switching operation or the like of the switching elements 241 and 242, respectively. The inductors 271 and 272 form filter circuits together with the capacitors 281 and 282, respectively.

Figure 4:
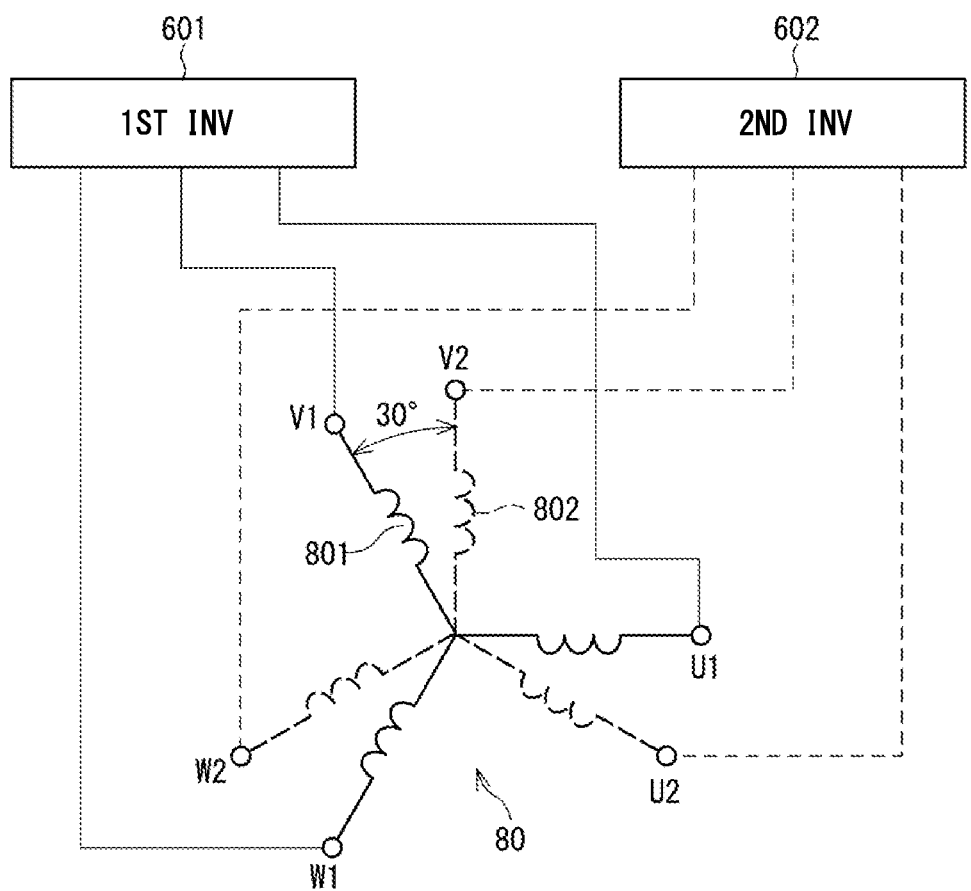
FIG. 4 is a schematic view of a configuration of a multi-phase coaxial motor.

As shown in FIG. 4, the motor 80 to be controlled by the ECU 10 is a three-phase brushless motor which has two systems of the three-phase windings 801 and 802 provided coaxially. The three-phase windings 801 and 802 have the same electrical characteristics, and are disposed on the same stator 840 with a shift of an electric angle of 30 [deg], which may be generalizable as (30±60×n) [deg] (n is an integer).

The two three-phase windings 801 and 802 are magnetically coupled to each other, and mutual inductance is generated between the systems. Therefore, there is a need for "decoupling control" that decouples a voltage generated in the three-phase winding of the subject system by the electric current flowing in the three-phase winding of the other system. "Decoupling" in the specification of the present disclosure is not about decoupling of interference among a d-axis and a q-axis in the same system, but about decoupling of inter-system interference, i.e., among two or more systems.

[Configuration of ECU and Microcomputer]

The overall configuration of the motor drive system is described with reference to FIG. 5. The ECU 10 includes a first microcomputer 401 and a second microcomputer 402 as "two systems of arithmetic units," and a first inverter 601 and a second inverter 602 as "two systems of power converters," and the like. The "first" indicates a component of the first system, and "second" indicates a component of the second system. In symbols representing physical quantities such as current, voltage, electric angle and the like, a last digit "1" indicates a physical quantity of the first system, and a last digit "2" indicates a physical quantity of the second system.

Figure 5:
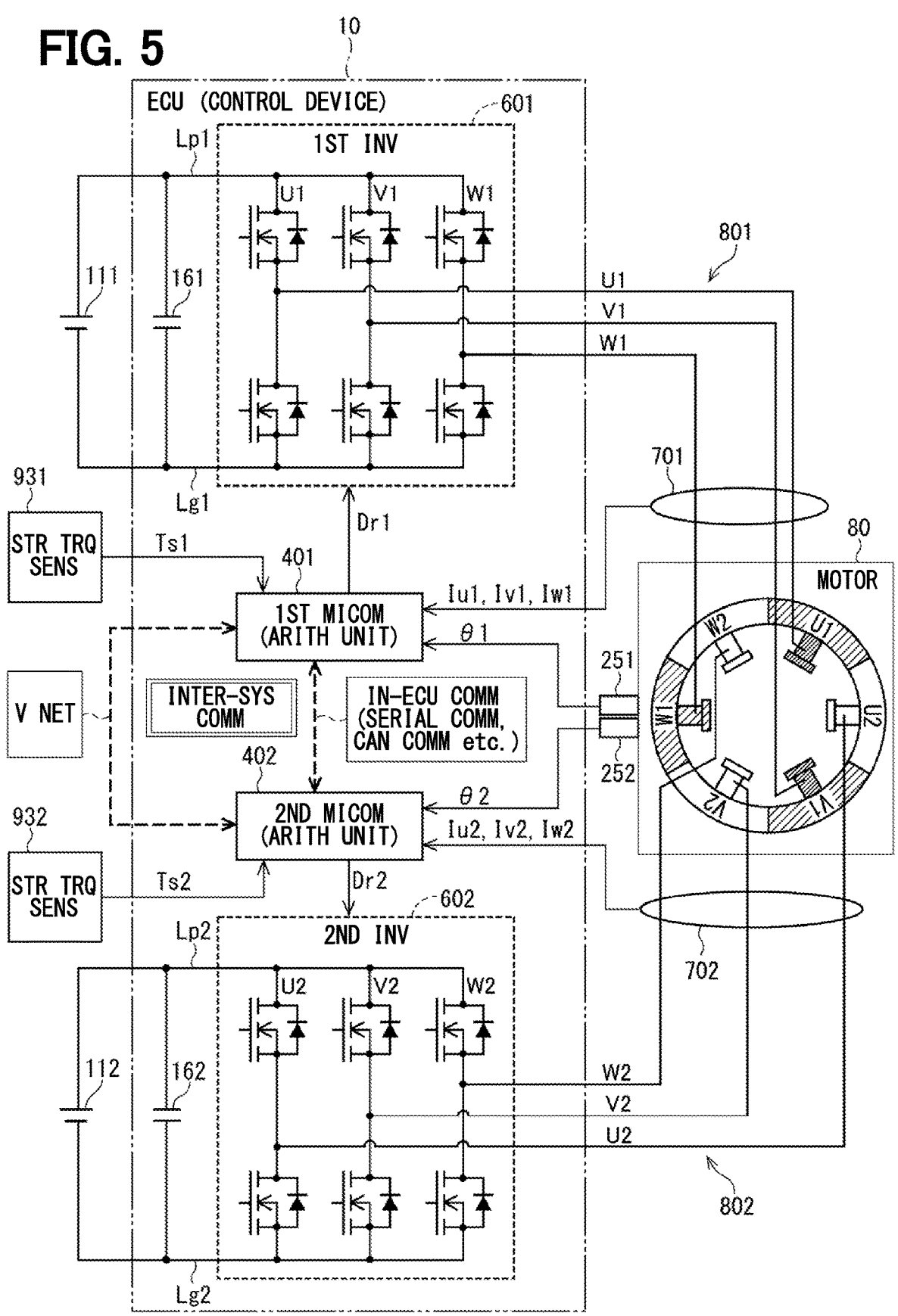
FIG. 5 is a configuration diagram of a motor drive system.
Figure 19:
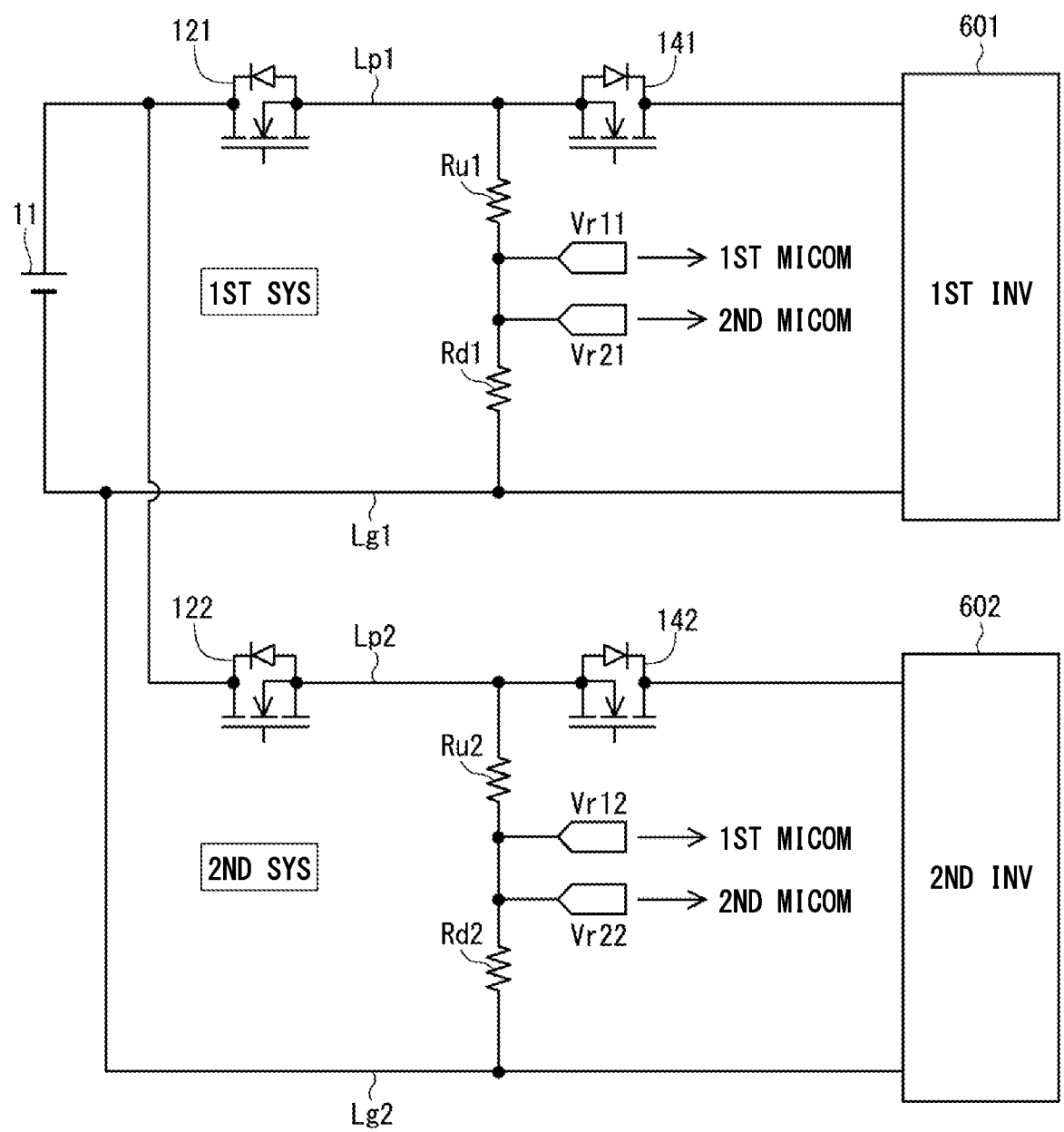
FIG. 19 is a diagram of a configuration example of a post-relay voltage monitor circuit.
Figure 21:
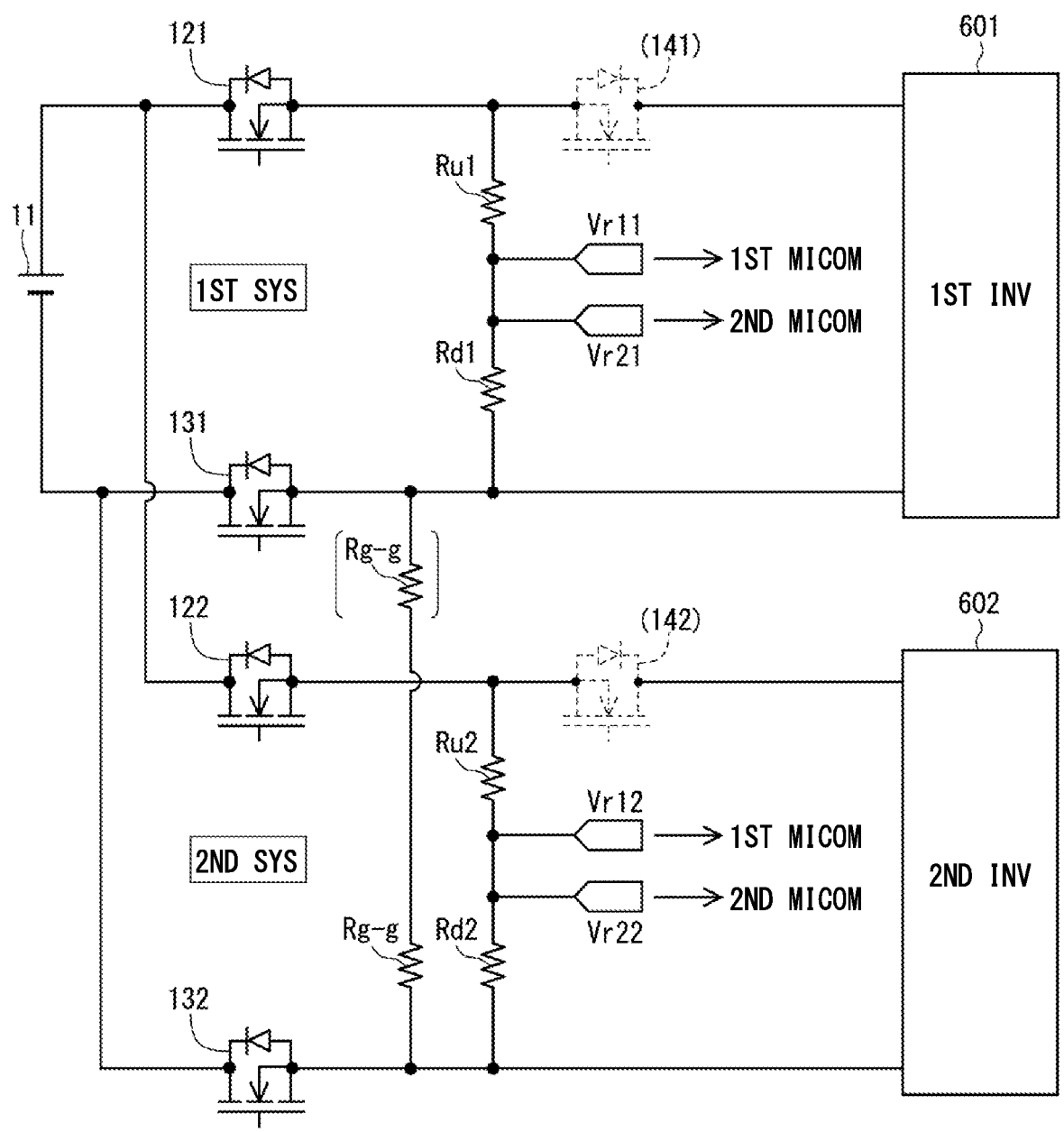
FIG. 21 is a diagram of other configuration example of the post-relay voltage monitor circuit.

In an example of system in FIG. 5, the inverters 601 and 602 of respective systems are connected to two independent, i.e., system-specific, batteries 111 and 112 provided system to system. Note that one battery, i.e., a battery 11 as shown in FIGS. 19 and 21, may also be shared by the two systems. In the inverters 601, 602, six switching elements such as MOSFETs are bridge-connected at positions between power supply lines Lp1, Lp2 and ground lines Lg1, Lg2. Smoothing capacitors 161 and 162 are provided at input sections of the inverters 601 and 602.

The inverters 601 and 602 respectively perform a switching operation according to drive signals Dr1 and Dr2 from the microcomputers 401 and 402 of the relevant systems, convert a direct current (DC) electric power of the batteries 111 and 112, and supply the converted power to the three-phase windings 801 and 802. In such manner, the inverters 601 and 602 can energize the two systems of the three-phase windings 801 and 802 individually.

Current detectors 701 and 702 respectively detect phase currents Iu1, Iv1, Iw1, Iu2, Iv2, and Iw2 flowing in the three-phase windings 801 and 802 of respective systems, and output detection results to the microcomputers 401 and 402. The rotation angle sensors 251 and 252 redundantly detect electric angles θ1 and θ2 of the motor 80, and output detection results to the microcomputers 401 and 402. Here, the electric angles θ1 and θ2 have a phase difference of 30 [deg]. Further, the steering torques Ts1 and Ts2 detected by the steering torque sensors 931 and 932 are input to the microcomputers 401 and 402.

The two microcomputers 401 and 402 are physically separated in hardware configuration, and are provided independently from each other. In other words, two microcomputers 401 and 402 are not configured to co-operate, i.e., are different from two cores of one microcomputer configured to co-operate. The microcomputers 401, 402 are respectively composed of, although not shown in the drawing, a CPU, a ROM, a RAM, an I/O, a bus line for connecting these components, and the like. The microcomputers 401, 402 respectively perform control by executing software process or hardware process. The software process may be implemented by causing the CPU to execute a program stored in a memory device such as a ROM, that is, in a non-transitory, tangible storage medium. The hardware process may be implemented by a special purpose electronic circuit.

The steering torques Ts1 and Ts2 are input to the microcomputers 401 and 402, respectively. The first microcomputer 401 performs an operation for controlling the electric current flowing from the first inverter 601 to the three-phase winding 801 by feedback control of the electric currents Iu1, Iv1, and Iw1 flowing in the first system three-phase winding 801. The second microcomputer 402 performs an operation for controlling the current flowing from the second inverter 602 to the three-phase winding 802 by feedback control of the electric currents Iu2, Iv2, and Iw2 flowing in the second-phase three-phase winding 802.

The first microcomputer 401 and the second microcomputer 402 communicate at least one kind of information at least in one direction, or preferably bidirectionally, by "inter-system communication." The "at least one kind of information" may mean any information related to control, such as a current instruction value, a current limit value, abnormality information and the like. The inter-system communication between the microcomputers 401 and 402 may be performed via a vehicle network such as CAN, or may be performed in the ECU 10 by serial communication or CAN communication. In particular, in the present embodiment, it is assumed that communication using a vehicle network having a relatively long communication cycle is used.

Figure 6:
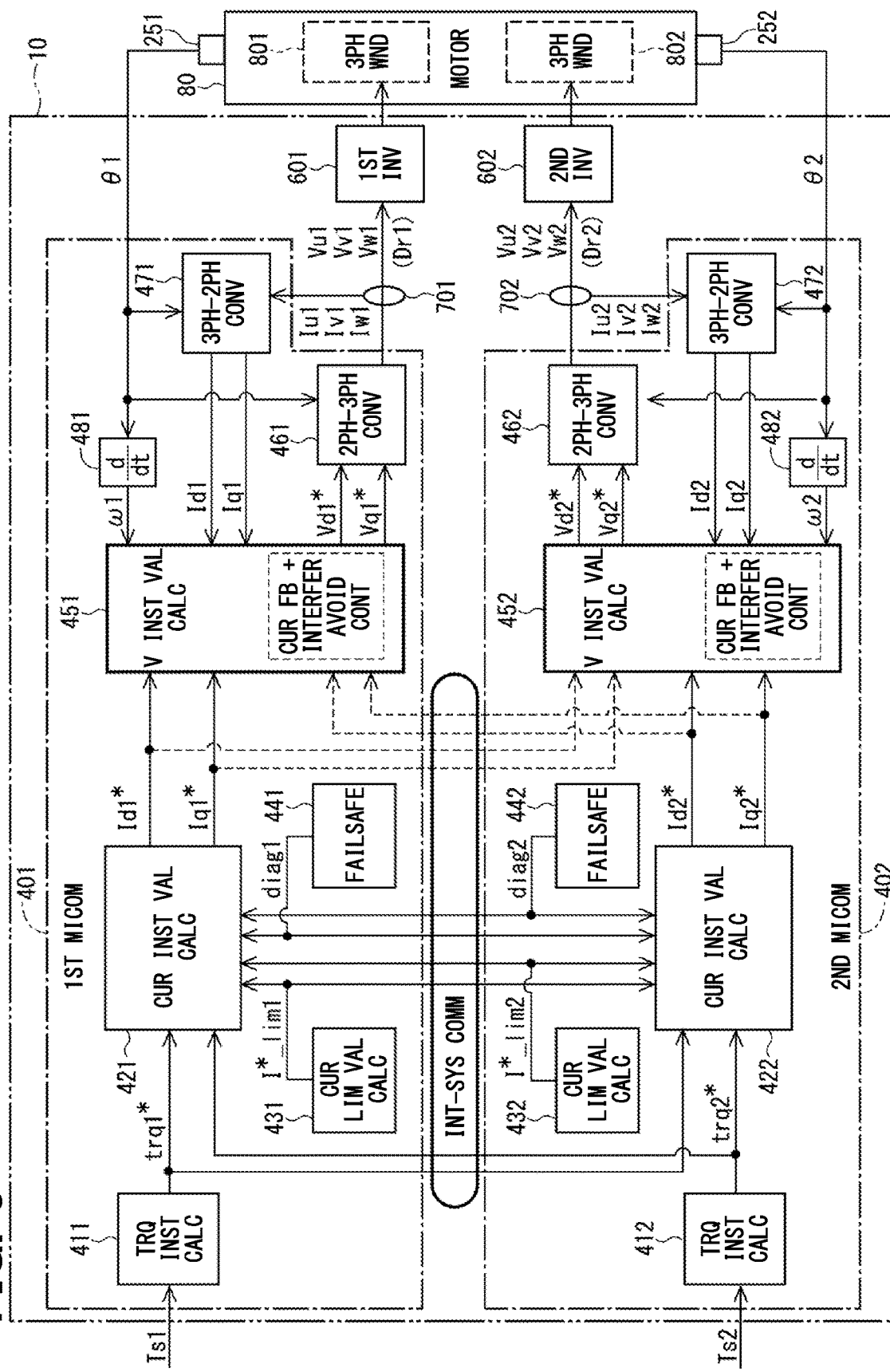
FIG. 6 is a control block diagram of two systems of arithmetic units (i.e., microcomputers)

Reference is now made to FIG. 6. The elements of the first microcomputer 401 are denoted by "1" at the last digit, and the elements of the second microcomputer 402 are denoted by "2" at the last digit. The first microcomputer 401 includes a torque instruction calculator 411, a current instruction value calculator 421, a current limit value calculator 431, a fail safe unit 441, a voltage instruction value calculator 451, a two-phase three-phase converter 461, a three-phase two-phase converter 471, and an angular velocity calculator 481. The second microcomputer 402 includes a torque instruction calculator 412, a current instruction value calculator 422, a current limit value calculator 432, a fail safe unit 442, a voltage instruction value calculator 452, a two-phase three-phase convertor 462, a three-phase two-phase convertor 472 and an angular velocity calculator 482. Note that, in FIG. 6, an inverter is described as "INV."

Since the configurations of the first microcomputer 401 and the second microcomputer 402 are substantially the same, the first microcomputer 401 is described as a representative of the two, with reference to the element numbers of the first system, for the "redundant" portions of the two systems. The second microcomputer 402 reads by substituting the last digit of "1" with the last digit of "2." The torque instruction calculator 411 calculates a torque instruction trq1* based on the steering torque Ts1.

The current instruction value calculator 421 receives various information of the subject system and of the other system such as a torque instruction trq1* of the subject system, and calculates dq-axes current instruction values Id1* and Iq1* based on such information. As one of various kinds of information, the current limit value calculator 431 calculates a current limit value I*_lim1 that is an upper limit of the current instruction value based on, for example, temperature of the inverter 601 and temperature of the three-phase winding 801. The current limit value I*_lim1 may be used as information that replaces the current instruction value.

Further, as one of various kinds of information, the fail safe unit 441 generates an abnormal signal diag1 reflecting a "control state." In the present embodiment, "abnormal" means an abnormality to an extent that current information for decoupling control cannot be obtained normally or the like. The fail safe unit 441 determines a control state in which an abnormality in the above-described sense may occur. Also, abnormalities such as communication interruption may occur in the inter-system communication. Even when such a communication abnormality occurs, the fail-safe unit 441 of the abnormal system that detected abnormality generates the abnormal signal diag1.

The torque instruction trq1* of the first system, the current limit value I*_lim1, and the abnormal signal diag1 are input to the current instruction value calculator 421 of the subject system, and are transmitted to the current instruction value calculator 422 of the second system, i.e., to the other system, via inter-system communication. Similarly, the torque instruction trq2*, the current limit value I*_lim2, and the abnormal signal diag2 of the second system are input to the current instruction value calculator 422 of the subject system, and are transmitted to the current instruction value calculator 421 of the first system, i.e., to the other system, via inter-system communication.

In such manner, the current instruction value calculator 421 calculates the current instruction values Id1* and Iq1* based on the input signal, and outputs calculation results to the voltage instruction value calculator 451 of the subject system. Also, as indicated by broken line arrows, the current instruction values Id1* and Iq1* of the subject system are transmitted to the voltage instruction value calculator 452 of the other system via inter-system communication. In such case, the current instruction value may be transmitted only in one direction from one system to the other system, not limited to bidirectional communication. In other words, in the present embodiment, the microcomputer at least in one system calculates a current instruction value based on an input signal, and transmits the current instruction value to the microcomputer in the other system.

The voltage instruction value calculator 451 calculates dq-axes voltage instruction values Vd1* and Vq1* by current feedback ("CUR FB" in the drawing) control that causes the actual currents Id1 and Iq1 to follow the current instruction values Id1* and Iq1*. Further, the voltage instruction value calculator 451 performs "decoupling control" for decoupling a voltage generated in the three-phase winding of the subject system by the current flowing in the three-phase winding of the other system. Details of the decoupling control are described later for each of the embodiments.

The two-phase three-phase convertor 461 performs coordinate conversion of the dq-axes voltage instruction values Vd1* and Vq1* into three-phase voltage instruction values Vu1, Vv1, and Vw1. Then, the inverter 601 is driven by the drive signal Dr1 generated based on the three-phase voltage instruction values Vu1, Vv1, and Vw1. The three-phase two-phase convertor 471 performs coordinate conversion of the phase currents Iu1, Iv1, and Iw1 into the dq-axes actual currents Id1 and Iq1 and feeds them back to the voltage instruction value calculator 451.

Although not shown in FIG. 6, the dq-axes actual currents Id1 and Iq1 are fed back to the voltage instruction value calculator 451 of the subject system and may also be transmitted to the voltage instruction calculator 452 of the other system via inter-system communication. In such case, the actual current may be transmitted only in one direction from one system to the other system, not limited to bidirectional communication. The angular velocity calculator 481 calculates an angular velocity ω1 by time differentiation of the electric angle 81 detected by the rotation angle sensor 251, and outputs the calculated angular velocity ω1 to the voltage instruction value calculator 451.

By the way, the control device of the related art performs decoupling control using one arithmetic unit shared by two systems, thereby it is not necessary to consider the communication load between the arithmetic units when obtaining the current information from the other systems. On the other hand, in the configuration in which information is communicated between the two systems of microcomputers 401 and 402 as in the present embodiment, there is a problem that communication load increases due to information obtainment for decoupling control.

Therefore, the ECU 10 of the present embodiment aims to reduce the communication load of inter-system communication for decoupling control by the two systems of microcomputers 401 and 402. A specific control configuration for that purpose is described for each of the embodiments. The ECU of each of the following embodiments is denoted with an embodiment number as the third (i.e., the last) digit, such as an ECU 101 in the first embodiment.

First Embodiment

Figure 7:
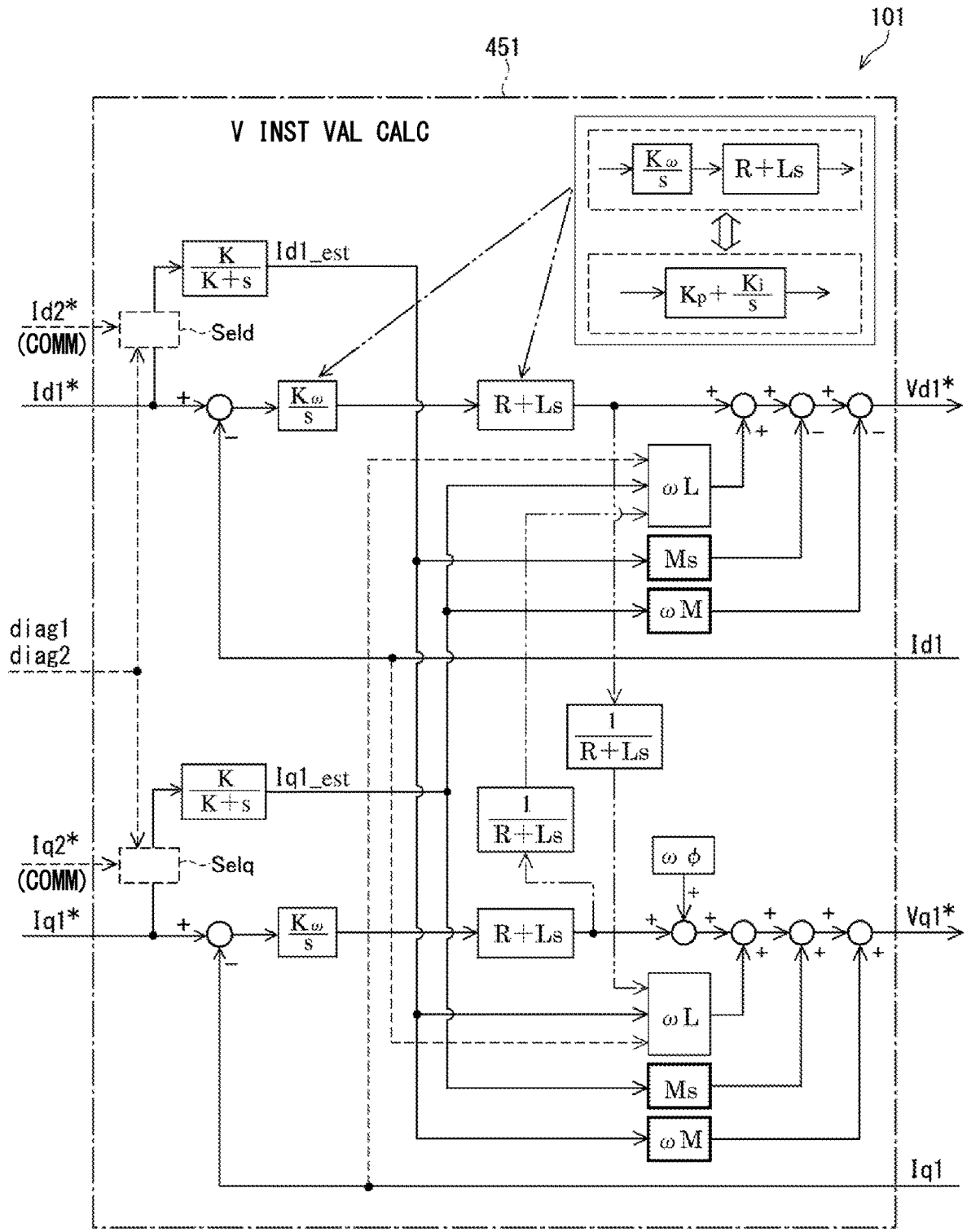
FIG. 7 is a block line diagram of signal transmission of a voltage instruction calculation unit according to a first embodiment.

FIG. 7 shows a configuration of the voltage instruction value calculator 451 of the first system in an ECU 101 of the first embodiment. For the second system (not shown in the drawing), the symbol "1" at the end of the description of the first system is replaced with "2." Signal transmission related to the calculation (e.g., arithmetic operation) of the d-axis voltage instruction value Vd1* is described in an upper half of the illustrative diagram of the voltage instruction value calculator 451, and signal transmission related to the calculation of the q-axis voltage instruction value Vq1* is described in a lower half thereof. Hereinafter, the d-axes or the q-axes of the subject system and the other systems may be respectively referred to as "in-phase axes." Further, the q-axis viewed from (i.e., with regards to) the d-axis or the d-axis viewed from the q-axis in the subject system or in the other system may be referred to as a "partner axis."

In FIG. 7 and subsequent drawings, R is a resistor of the three-phase windings 801 and 802, L is a self-inductance, M is a mutual inductance, ω is an angular velocity converted to a rotation number, and φ is a counter electromotive voltage constant. Further, s is a Laplace operator, and Kω and K are constants of a transfer function. Basic signal transmission from the d-axis current instruction value Id1* to the d-axis voltage instruction value Vd1* and from the q-axis current instruction value Iq1* to the q-axis voltage instruction value Vq1* is shown in FIG. 6 which motor inverse model is disclosed in the related art.

For each of the dq-axes, a deviation between the current instruction values Id1* and Iq1* and the actual currents Id1 and Iq1 is multiplied by the transfer function "Kω/s," and further multiplied by the transfer function "R+Ls." As shown in an upper right portion of FIG. 7, a series combination of "Kω/s" and "R+Ls" is equivalent to a proportional-integral (PI) control transfer function "Kp+(Ki/s)" represented by using a proportional gain Kp and an integral gain Ki. Therefore, a (Kω/s)×(R+Ls) term is referred to as a "PI control term" for convenience. The d-axis voltage instruction value Vd1* is calculated by adding or subtracting the ωL term, the Ms term, and the ωM term to the PI control term. The q-axis voltage instruction value Vq1* is calculated by an addition of a ωφ term as a counter electromotive voltage term further to the PI control term, the ωL term, the Ms term, and the ωM term.

Here, the Ms term and the ωM term including the mutual inductance M are control amounts for decoupling the voltage generated in the three-phase winding of the subject system due to the electric current flowing in the three-phase winding of the other system, which may hereafter be referred to as "decoupling control amount." In the drawing, frame lines of the Ms term and the ωM term, which are decoupling control amounts, are respectively drawn as a bold line. In the basic motor inverse model, the decoupling control amount is calculated by inputting the in-phase axis current of the other system to the Ms term, and inputting the partner axis current of the other system to the ωM term. On the other hand, in the present embodiment, "estimated currents Id1_est and Iq1_est calculated based on current instruction values of the subject system or the other system" are used for calculating the decoupling control amount of the subject system.

In FIG. 7, current instruction value selection units Seld and Selq are respectively indicated by a broken line at a branch position from the input section of the current instruction values Id1* and Iq1*. The d-axis current instruction value selection unit Seld can select either or both of the d-axis current instruction values Id1* and Id2* of the subject system and the other system. The q-axis current instruction value selection unit Selq can select either or both of the q-axis current instruction values Iq1* and Iq2* of the subject system and the other system. Here, the current instruction values Id2* and Iq2* of the other system are obtained by communication.

However, in the configuration in which the estimated currents Id1_est and Iq1_est are always calculated based on the current instruction values Id1* and Iq1* of the subject system, the current instruction value selection units Seld and Selq may be omitted. When there is no current instruction value selection units Seld, Selq, or when the current instruction value selection units Seld, Selq select the current instruction value Id1*, Iq1* of the subject system, the current instruction values Id1*, Iq1* of the subject system are respectively multiplied by the transfer function "K/(K+s)." The transfer function "K/(K+s)" is derived from the current controller and the motor model. The calculated estimated currents Id1_est and Iq1_est are used for calculating the decoupling control amount of the subject system. The estimated current of the subject axis is input to the Ms term, and the estimated current of the partner axis is input to the ωM term.

As described above, the voltage instruction value calculator 451 calculates the estimated currents Id1_est and Iq1_est by the current controller and the motor model based on the current instruction values Id1* and Iq1*. Then, the voltage instruction value calculator 451 calculates the decoupling control amount by using the estimated currents Id1_est and Iq1_est, and calculates the voltage instruction values Vd1* and Vq1*.

Further, the calculation of the ωL term is described. In the motor inverse model, the ωL term is an interference term between dq axes to which the partner axis current of the subject system is input. Since it is not an interference term between the systems, it is not included in the "decoupling control amount" in the specification of the present disclosure. Therefore, the configuration is not limited to the one in which the ωL term is calculated by using the estimated currents Id1_est and Iq1_est based on the current instruction values Id1* and Iq1*, as shown by a solid line in FIG. 7. For example, as indicated by a broken line, the ωL term may be calculated by using the actual current of the partner axis of the subject system. Alternatively, as indicated by a two-dot chain line, the ωL term may be calculated by using an electric current obtained by multiplying the PI control term of the voltage dimension of the subject system by the transfer function "1/(R+Ls)" of the motor model. Although not shown in FIGS. 11 and 18 of the second and third embodiments below, the ωL term can be calculated in the same manner.

Figure 8:
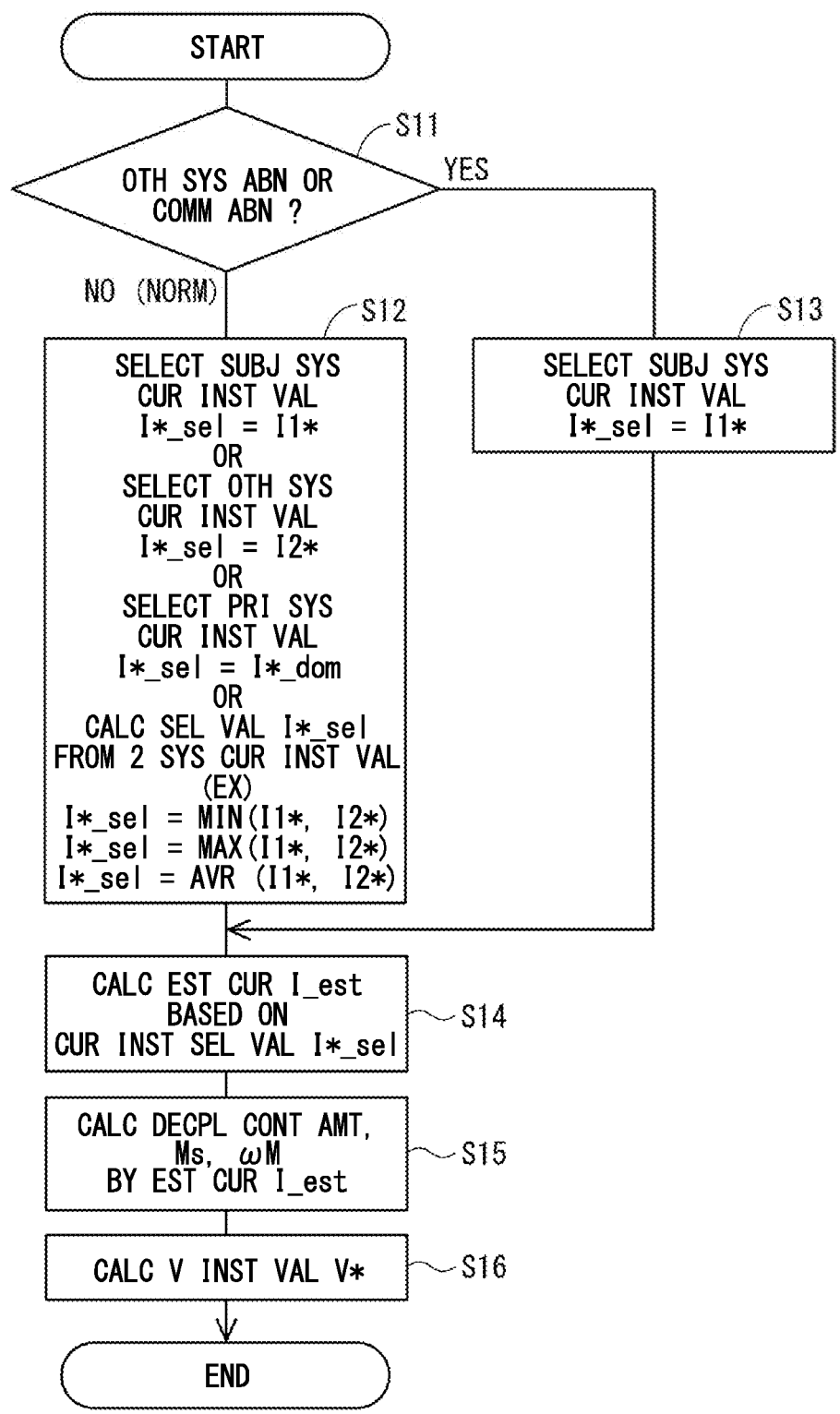
FIG. 8 is a flowchart of a current instruction value selection process by a current instruction value selection unit.

Next, with reference to the flowchart of FIG. 8, a description is given of a process in which the current instruction value selection units Seld and Selq respectively select a current instruction value according to the control state of respective systems or the presence or absence of communication abnormality. In the following description, the current instruction values of the first system and the second system are described as "I1*, I2*" without distinguishing the d axis and the q axis. The current instruction value selection unit is simply referred to as "Sel", and the current instruction value selection value selected by the current instruction value selection unit Sel is referred to as "I*_sel." In the following flowchart, a symbol S indicates a step.

In S11, the current instruction value selection unit Sel determines whether an abnormality of the other system or a communication abnormality has occurred based on the abnormal signals diag1, diag2 generated by the fail safe units 441, 442 of the respective microcomputers 401, 402. The "abnormality of the other system" includes an abnormality of the second microcomputer 402, an abnormality of the switching element of the second inverter 602, a short circuit of the relay provided in the circuit, an open failure, a disconnection failure of the three-phase winding 802, and the like. The communication abnormality includes communication interruption and the like. An abnormal mode is described later with reference to FIG. 22. In FIG. 8, the first system is treated/described as the subject system, and the second system as the second system. Further, it is assumed that the subject system is normal.

If NO is determined in S11, the other system is normal and the communication is normal. In such case, in S12, the current instruction value selection unit Sel may select/set either the current instruction value I1* of the subject system or the current instruction value I2* of the other system as the current instruction selection value I*_sel. Alternatively, the preset current instruction value I*_dom of a priority system may be selected/set in common for both systems.

The current instruction value selection unit Sel may calculate the current instruction selection value I*_sel from both of the current instruction value I1* of the subject system and the current instruction value I2* of the other system. For example, the current instruction value selection unit Sel may select either a smaller value "MIN (I1*, I2*)," a larger value "MAX (I1*, I2*)," an average value "AVG (I1*, I2*)" or the like from the current instruction values I1* and I2* of the two systems as the current instruction selection value I*_sel.

If YES is determined in S11, the current instruction value I2* of the other system cannot be used because the other system is abnormal or the communication is abnormal. In such case, in S13, the current instruction value selection unit Sel sets the current instruction value I1* of the subject system as the current instruction selection value I*_sel. Further, separately from the decoupling control, the current limit values I*_lim1 and I*_lim2 may be treated by a changing process or by an abnormality handling process for the other kinds of abnormality. Details of such process are omitted here.

The voltage instruction value calculator 451 calculates the estimated current I_est based on the current instruction selection value I*_sel in S14, and calculates the Ms term and the ωM term that are the decoupling control amounts by using the estimated current I_est in S15. In S16, the voltage instruction value V* including the PI control term and the ωL term is calculated.

As described above, the microcomputers 401 and 402 of the respective systems bidirectionally transmit and receive the abnormality information with each other. Assuming that the subject system is normal, the microcomputers 401 and 402 of the respective systems calculate the estimated current I_est based on at least one of (i) the current instruction value I1* calculated by the microcomputer of the subject system when the other system is normal and the communication is normal or (ii) the current instruction values I2* calculated by the microcomputer of the other system and obtained via inter-system communication. In particular, when performing decoupling control based only on the current instruction value I1* of the subject system, the communication load can be reduced because the current information of the other system is not used.

Further, the microcomputers 401 and 402 of the respective systems calculate the estimated current I_est based on the current instruction value I1* calculated by the microcomputer of the subject system when the other system is abnormal or when the communication is abnormal. Thereby, when the other system is normal, information on the other system is used as much as possible, and errors due to variations between the systems are reduced. Further, when the other system is abnormal, the situation where the estimated current I_est cannot be calculated is avoidable by using the information of the normal subject system.

Figure 9:
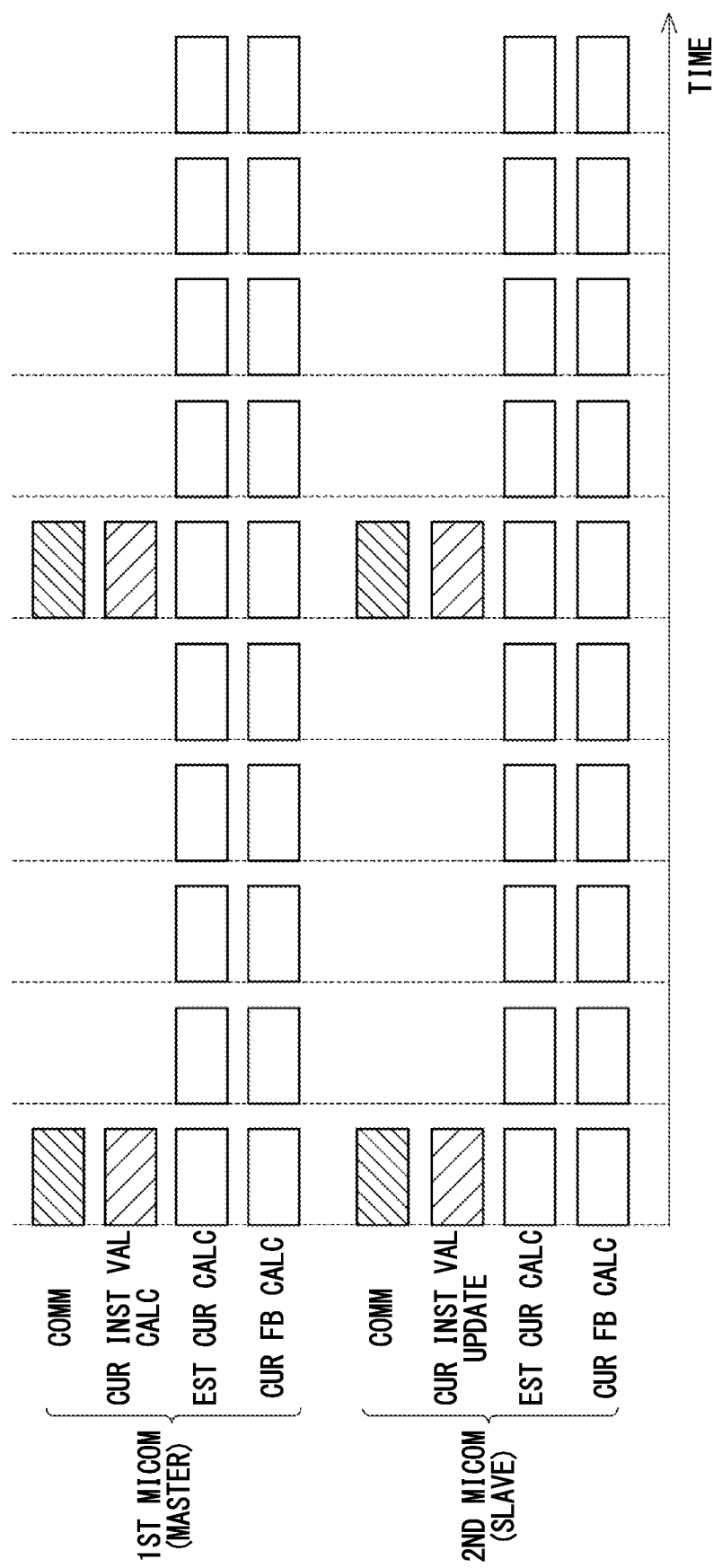
FIG. 9 is a time chart of a first configuration example regarding a process cycle of the respective systems.
Figure 10:
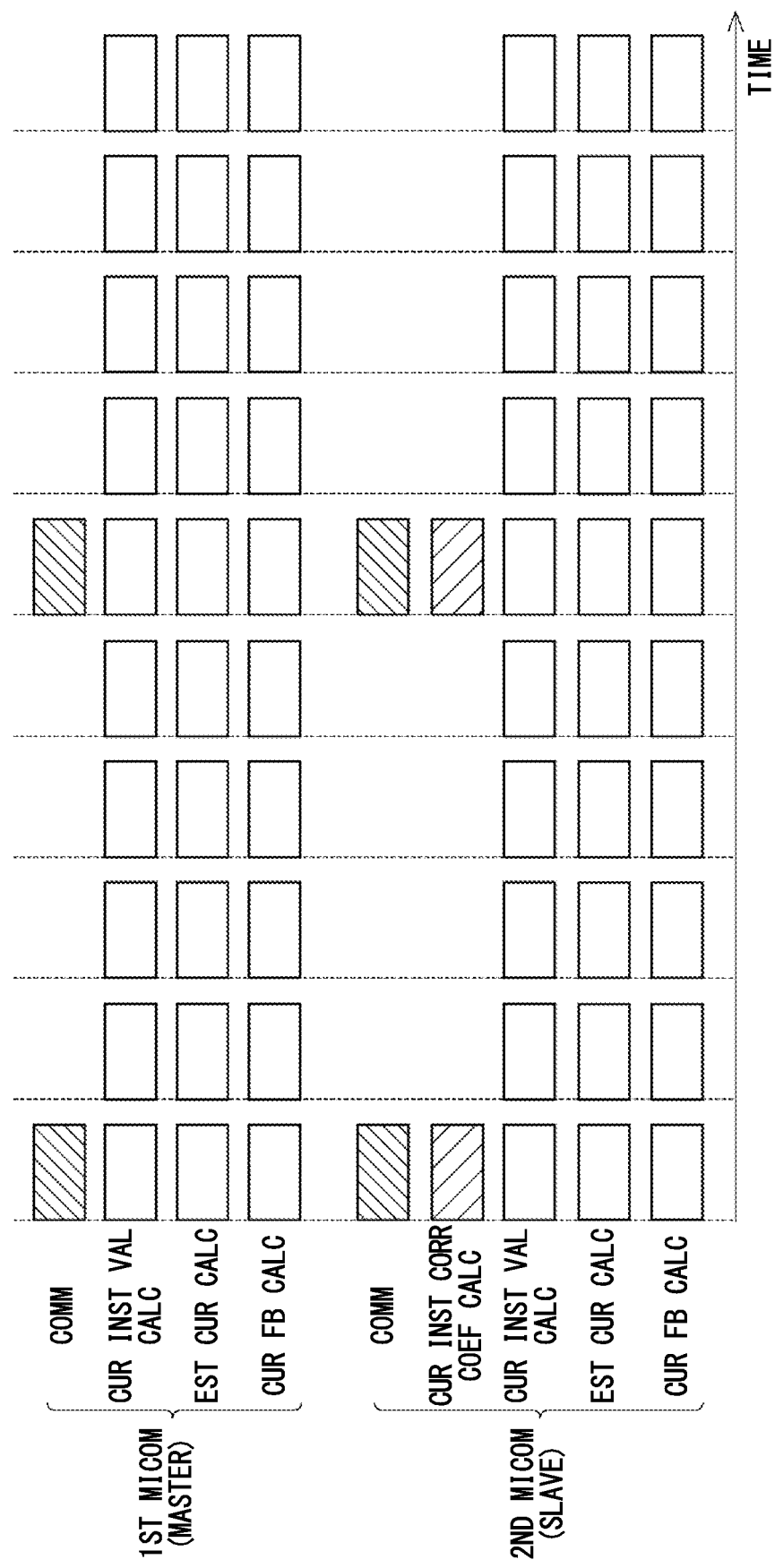
FIG. 10 is a time chart of a second configuration example regarding the process cycle of the respective systems.

Next, with reference to the time charts of FIGS. 9 and 10, a configuration example related to the process cycle for processing the electric current by the microcomputers 401 and 402 of the respective systems is described. In FIGS. 9 and 10, for example, the first microcomputer 401 operates as a master, and the second microcomputer 402 operates as a slave. For example, the "long cycle" is illustrated as a cycle that is five times longer than the "short cycle." In other words, while the "long cycle" process is performed once, the "short cycle" process is performed, for example, five times. However, the specific cycle ratio is not limited to such number.

In the first configuration example shown in FIG. 9, the master calculates a current instruction value and communicates the value with the slave. The slave that has received the current instruction value from the master updates the current instruction value. The current feedback calculation by the master and the slave is performed at a cycle shorter than the communication cycle of the current instruction value in the inter-system communication. The calculation of the estimated current is performed in a cycle that is equivalent to or shorter than the cycle of the current feedback calculation.

In the second configuration example shown in FIG. 10, the slave that has received the current instruction value from the master calculates a current instruction correction coefficient, and calculates the slave current instruction value by multiplying the master current instruction value by the current instruction correction coefficient. The current feedback calculation by the master and the slave is performed in a cycle shorter than the communication cycle of the current instruction value and the calculation cycle of the current instruction correction coefficient. The calculation of the estimated current is performed in a cycle that is equivalent to or shorter than the cycle of the current feedback calculation.

Details of the calculation of an electric current instruction correction coefficient are shown in the following. Here, symbols are defined as follows. Mn: Current instruction value of master in the nth cycle Mn−1: Current instruction value of master in the (n−1)th cycle Sn: Current instruction value of slave in the nth cycle Sn−1: Current instruction value of slave in the (n−1) the cycle An: First correction coefficient in the nth cycle Bn: Second correction coefficient in the nth cycle The master current instruction values Mn and Mn−1 in the nth cycle and the (n−1)th cycle are represented by the current instruction values Sn and Sn−1 in the nth cycle and the (n−1)th cycle, and the first and second correction coefficients An and Bn in the nth cycle by equations (1.1) and (1.2).

$$Mn = An \times Sn + Bn \tag{1.1}$$

$$Mn-1 = An \times Sn-1 + Bn \tag{1.2}$$

From the equations (1.1) and (1.2), equations (1.3) and (1.4) are derived for the first and second correction coefficients An and Bn in the nth cycle. Therefore, the current instruction correction coefficient is calculated based on the previous and current values of the master and slave current instruction values.

$$An = (Mn-1 - Mn)/(Sn-1 - Sn) \tag{1.3}$$

$$Bn = (MnSn-1 - Mn-1Sn)/(Sn-1 - Sn) \tag{1.4}$$

Overall, the microcomputers 401 and 402 of the respective systems perform the current feedback calculation for the electric current flowing in the three-phase windings 801 and 802 of the subject system in a relatively short cycle, while performing the inter-system communication in a relatively long cycle. In such manner, even when the performing decoupling control by using the current information of the other system obtained via inter-system communication, the communication load is reduced by using "coarse communication" that has a communication cycle longer than the calculation cycle (i.e., the arithmetic operation cycle) of current feedback calculation.

Second Embodiment

Figure 11:
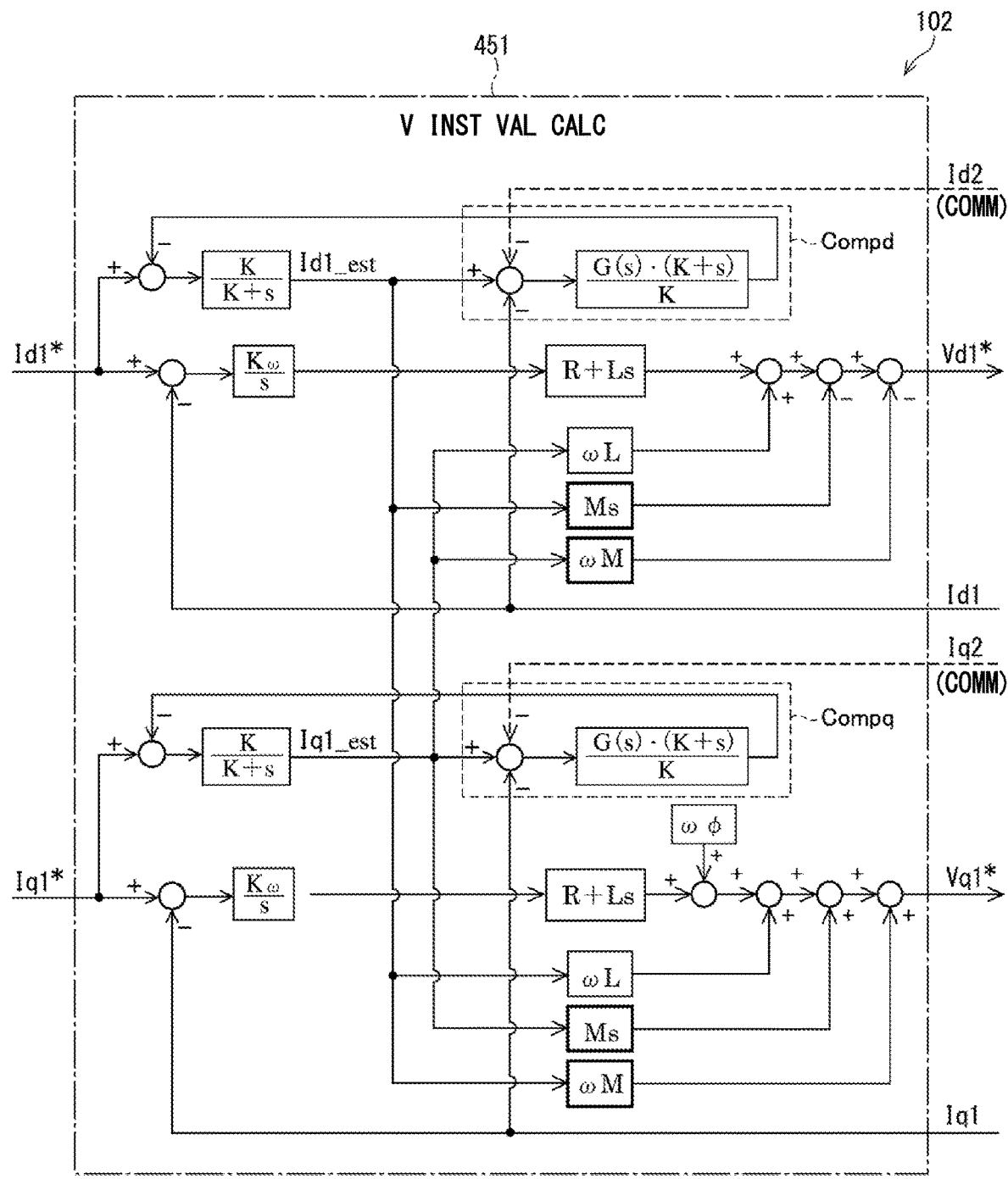
FIG. 11 is a block line diagram of signal transmission of a voltage instruction calculation unit according to a second embodiment.

The second embodiment is described with reference to FIGS. 11 to 13. FIG. 11 shows the configuration of the voltage instruction value calculator 451 of the first system in an ECU 102 of the second embodiment. Further to the configuration of the first embodiment shown in FIG. 7, estimated current correction units Compd and Compq are provided for the d axis and the q axis of the respective systems in the second embodiment. The estimated current correction units Compd and Compq of the first system correct the estimated currents Id1_est and Iq1_est based on the actual currents Id1 and Iq1 flowing in the three-phase winding 801 of the subject system, as indicated by a solid line arrow.

Note that the range of the estimated current correction units Compd and Compq is may have to be considered as up to a tip of the arrow pointing to the subtracter after the current instruction value. However, for the sake of convenience of illustration, the range od Compd/Compq includes the middle part of the arrow. Further, illustration of the current instruction value selection units Seld and Selq shown in FIG. 7 is omitted from FIG. 11. The voltage instruction value calculator 452 of the second system is interpreted in the same manner by reversely replacing the last digits "1" and "2" of the symbol of the electric current in the description of the first system.

The d-axis estimated current correction unit Compd is described as an example. The actual current Id1 of the subject system is fed back to the estimated current Id1_est. Then, a value obtained by multiplying the difference between the estimated current Id1_est and the actual current Id1 by the transfer function "G(s)·(K+s)/K" is subtracted from the current instruction value Id1\*. The decoupling control amount is calculated by using the estimated current Id1_est, which has been obtained by multiplying the subtraction value by the transfer function "K/(K+s)" of the estimation calculation.

As described above, the first microcomputer 401 corrects the estimated currents Id1_est and Iq1_est by feedback calculation of the actual currents Id1 and Iq1 of the subject system, and calculates the decoupling control amount by using the corrected estimated currents Id1_est and Iq1_est. Similarly, the second microcomputer 402 corrects the estimated currents Id2_est and Iq2_est by feedback calculation of the actual currents Id2 and Iq2 of the subject system, and calculates the decoupling control amount by using the corrected estimated currents Id2_est and Iq2_est.

Figure 12A:
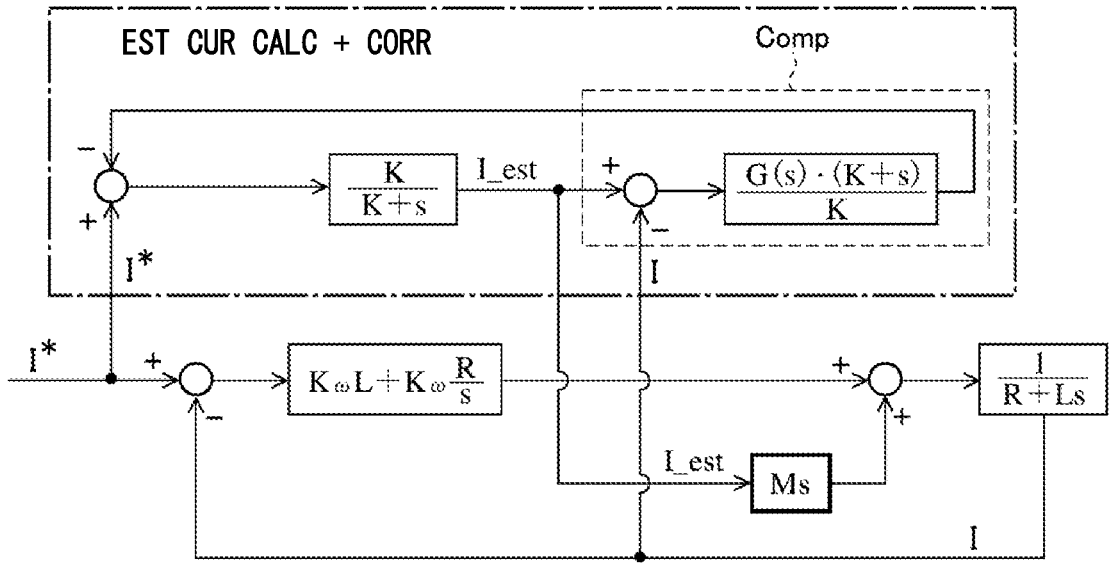
FIG. 12A is a block line diagram obtained by equivalently converting a relationship between the current instruction value, an actual current, and an estimated current in control configuration of FIG. 11.
Figure 12B:
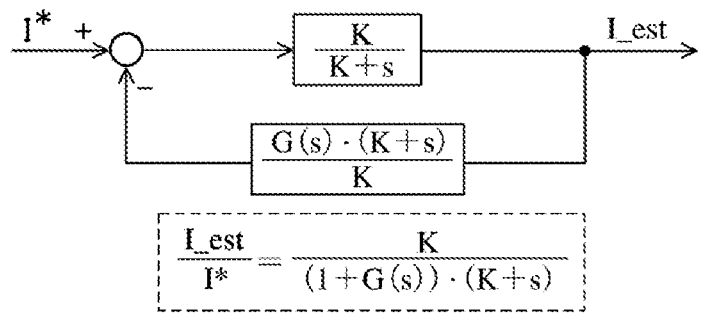
FIG. 12B is a block line diagram of a transfer function from the current instruction value to the estimated current.
Figure 12C:
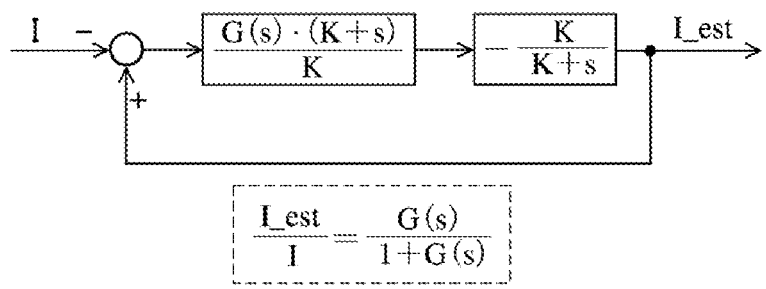
FIG. 12C is a block line diagram of a transfer function from the actual current to the estimated current.

Reference is now made to FIG. 12A to FIG. 12C. In FIGS. 12A, 12B, 12C, the d-axis and q-axis currents are not distinguished, and comprehensive symbols are used. FIG. 12A shows a block line diagram obtained by equivalently converting the relationship between the current instruction value I\*, the actual current I, and the estimated current I_est in the control configuration of FIG. 11. As the decoupling control amount, only the Ms term related to the estimated current I_est of the subject axis is described. The actual current I is fed back by multiplying the voltage after adding the Ms term by "1/(R+Ls)" by the motor model.

A block line diagram of the calculation unit of the estimated current I_est including the correction based on the actual current I is shown in the one-dot chain line frame in FIG. 12A. FIG. 12B is a block line diagram obtained by equivalently converting signal transmission from the current instruction value I\* to the estimated current I_est in the estimated current calculation unit. FIG. 12C shows a block diagram obtained by equivalently converting signal transmission from the actual current I to the estimated current I_est in the estimated current calculation unit.

In FIG. 12B, the transfer function "K/(K+s)" and "G(s)·(K+s)/K" are feedback-coupled. A transfer function from the current instruction value I\* to the estimated current I_est is obtained as an equation (2).

$$\text{I\_est} = \frac{K}{K+s} \times \left( \frac{-G(s) \cdot (K+s)}{K} \times \text{I\_est} + I^* \right) \quad (2)$$

-continued $$\frac{K+s}{K} \times \text{I\_est} = \frac{-G(s) \cdot (K+s)}{K} \times \text{I\_est} + I^*$$

$$(1 + G(s)) \frac{K+s}{K} \times \text{I\_est} = I^*$$

$$\frac{\text{I\_est}}{I^*} = \frac{K}{(1 + G(s)) \cdot (K+s)}$$

In FIG. 12C, the series coupling of the transfer functions "G(s)·(K+s)/K" and "−K/(K+s)" and the feedback coupling are combined. A transfer function from the actual current I to the estimated current I_est is obtained as an equation (3).

$$\text{I\_est} = -G(s)(-I + \text{I\_est}) \quad (3)$$

$$(1 + G(s))\text{I\_est} = G(s)I$$

$$\frac{\text{I\_est}}{I} = \frac{G(s)}{1 + G(s)}$$

When a specific example of the transfer function G(s) is "G(s)=g/(s)," the following equations (4.1) and (4.2) are obtained from the equations (2) and (3).

$$\frac{\text{I\_est}}{I^*} = \frac{s}{s+g} \cdot \frac{K}{K+s} \quad (4.1)$$

$$\frac{\text{I\_est}}{I} = \frac{g}{s+g} \quad (4.2)$$

When the equations (4.1) and (4.2) are put together, an equation (4.3) is obtained. "s/(s+g)" in the first term on the right side of the equation (4.3) corresponds to a high-pass filter ("HPF" below the relevant term), and "g/(s+g)" in the second term on the right side represents a low-pass filter (i.e., "LPF" below the relevant term). Therefore, in terms of transfer characteristics, a high frequency component has a higher contribution of the current instruction value I\* to the estimated current I_est, and a low frequency component has a higher contribution of the actual current I.

$$\text{I\_est} = \frac{K}{K+s} \cdot I^* \cdot \underbrace{\frac{s}{s+g}}_{HPF} + I \cdot \underbrace{\frac{g}{s+g}}_{LPF} \quad (4.3)$$

As another example of the transfer function G(s), assuming a case of "G(s)=g/(1+Ts)," the following equations (5.1) and (5.2) are obtained from the equations (2) and (3).

$$\frac{\text{I\_est}}{I^*} = \frac{Ts+1}{Ts+1+g} \cdot \frac{K}{K+s} \quad (5.1)$$

$$\frac{\text{I\_est}}{I} = \frac{g}{Ts+1+g} \quad (5.2)$$

Figure 13A:
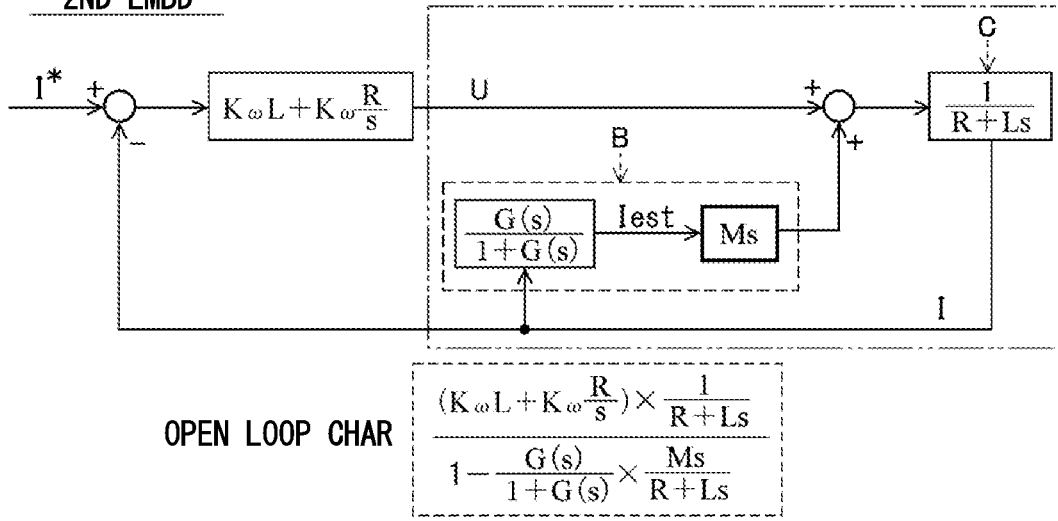
FIG. 13A is a block line diagram of signal transmission in the second embodiment.

Next, open loop characteristics of the second embodiment are described with reference to FIG. 13A to FIG. 13C. FIG. 13A shows a block diagram obtained by equivalently converting FIG. 12A by applying the equation (3) to the real current I to be fed back. If B(s)=Ms·{G(s)/(1+G(s))} and C(s)=1/(R+Ls) are assumed, a transfer function from an input U(s) to an output I(s) in the two-dot chain line frame is represented by an equation (6.1). Further, in the drawing and in the following equations, a function part (s) of B(s), C(s), U(s), and I(s) is omitted. From the equation (6.1), the open loop characteristics of the second embodiment are represented by an equation (6.2).

$$I = C(U + BI) \quad (6.1)$$
$$(1 - BC)I = CU$$
$$\frac{I}{U} = \frac{C}{1 - BC}$$
$$\frac{I}{U} = \frac{\frac{1}{R + Ls}}{1 - \frac{G(s)}{1 + G(s)} \times \frac{Ms}{R + Ls}}$$

$$\frac{\left(K_\omega L + K_\omega \frac{R}{s}\right) \times \frac{1}{R + Ls}}{1 - \frac{G(s)}{1 + G(s)} \times \frac{Ms}{R + Ls}} \quad (6.2)$$

Figure 13B:
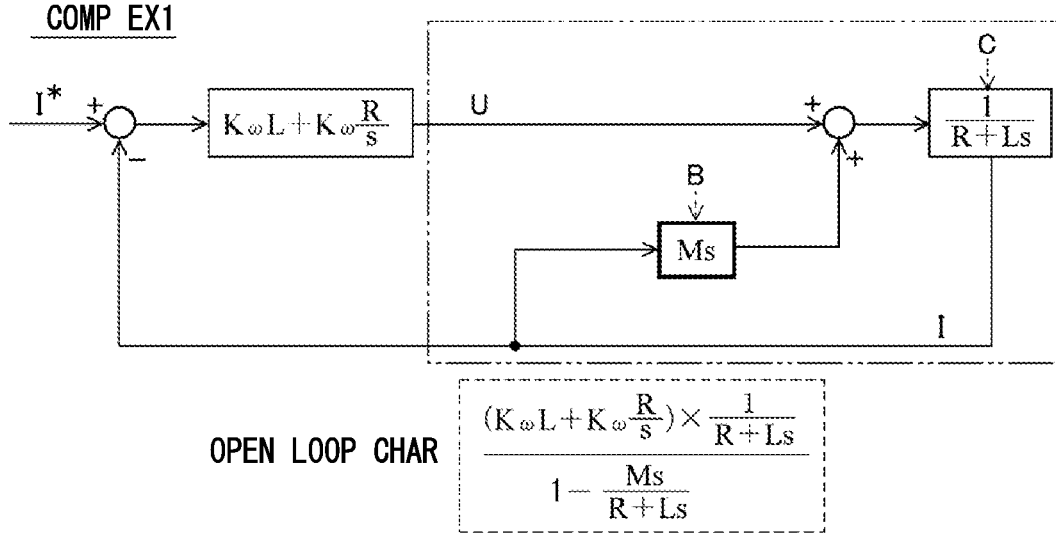
FIG. 13B is a block line diagram of a the comparative example 1.
Figure 13C:
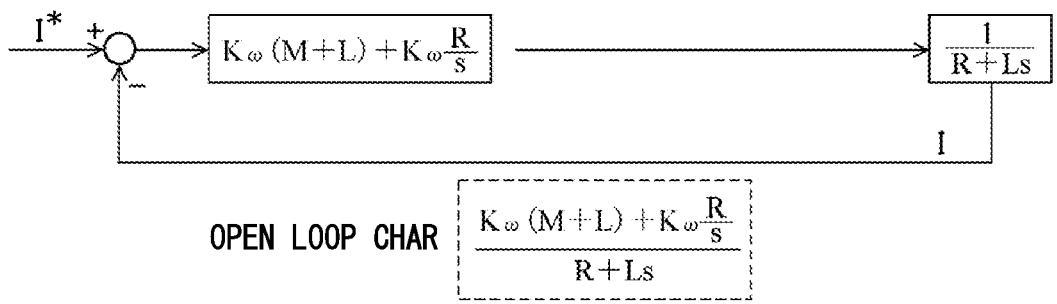
FIG. 13C is a block line diagram a the comparative example 2.

FIGS. 13B and 13C are block line diagrams of other decoupling control, i.e., comparative examples 1 and 2. In the the comparative example 1 shown in FIG. 13B, the actual current I of the subject system is used as it is, so that the electric current of the other system is replaced with the electric current of the subject system and the decoupling control amount is calculated. The transfer function from the input U(s) to the output I(s) in the the comparative example 1 is represented by an equation (7.1), which is similar to the above equation (6.1). Further, the open loop characteristics of the the comparative example 1 is represented by an equation (7.2).

$$\frac{I}{U} = \frac{\frac{1}{R + Ls}}{1 - \frac{Ms}{R + Ls}} \quad (7.1)$$

$$\frac{\left(K_\omega L + K_\omega \frac{R}{s}\right) \times \frac{1}{R + Ls}}{1 - \frac{Ms}{R + Ls}} \quad (7.2)$$

In the comparative example 2 of FIG. 13C, the decoupling control is performed by replacing the electric current of the other system with the electric current instruction value I* of the subject system. The open loop characteristics of the comparative example 2 is represented by an equation (8).

$$\frac{K_\omega(M + L) + K_\omega \frac{R}{s}}{R + Ls} \quad (8)$$

(Comparison Between Open Loop Characteristics and Closed Loop Characteristics)

Next, referring to FIGS. 14 to 17, the open loop characteristics and the closed loop characteristics of the first and second embodiments and of the comparative examples 1 and 2 are compared. In the current control in general, a phase delay of an open loop is determined by the control cycle, so that the stability is improved as the open loop gain is lower. Further, the higher the closed loop gain, the better the output response becomes to the instruction value. In other words, when the open loop gain is low and the closed loop gain is high, highly stable and high responsive characteristics are achieved.

Figure 14:
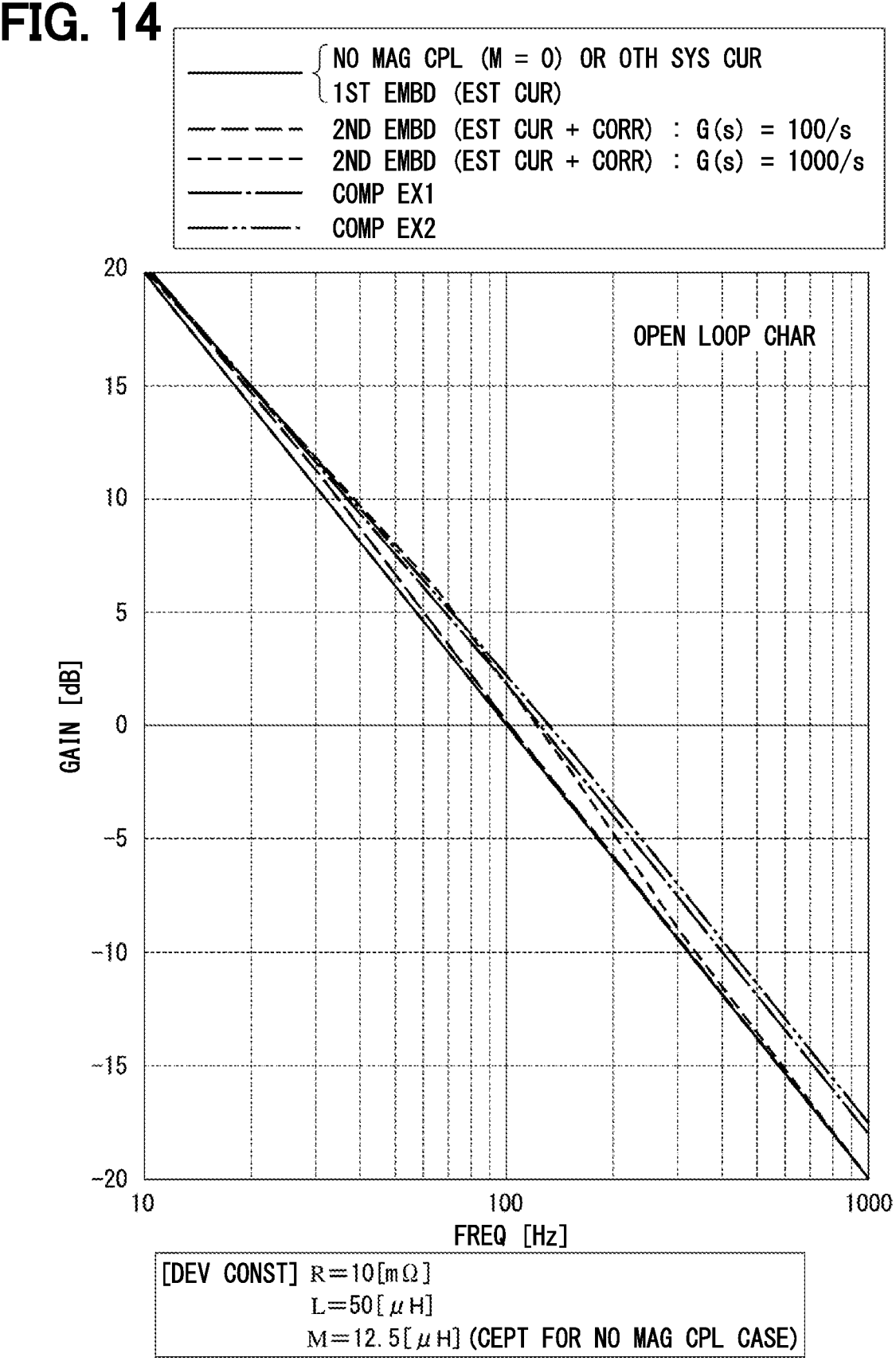
FIG. 14 is a frequency characteristic diagram of open loop characteristics.

FIG. 14 shows the open loop characteristics. As device constants, a resistor R is 10 [mΩ], a self-inductance L is 50 [µH], and a mutual inductance M is 12.5 [µH] except when there is no magnetic coupling between the systems (that is, when M=0). The open loop gain when there is no magnetic coupling or when the decoupling control of the subject system is performed by using the electric current of the other system is the lowest, as shown by a solid line in the drawing.

The open loop characteristics of the first embodiment using the estimated current I_est without correction substantially overlaps the solid line of when there is no magnetic coupling, and the control is stable in the entire frequency range. On the other hand, in the the comparative example 1 indicated by the one-dot chain line and in the the comparative example 2 indicated by the two-dot chain line, the open loop gain increases and the control becomes unstable.

In the second embodiment in which the estimated current I_est is corrected, the open loop characteristics when the transfer function for correction is "G(s)=100/s" are indicated by a long broken line, and the open loop characteristics when the transfer function for correction is "G(s)=1000/s" are indicated by a short broken line. The open loop characteristics of the second embodiment appear between the solid line of the first embodiment and the one-dot chain line and the two-dot chain line of the comparative examples 1 and 2.

More specifically, as reflected in the equation (4.3), in the low frequency range where the actual current I is used for the calculation of the estimated current I_est, the open loop gain becomes higher than that in the case of no magnetic coupling or in the first embodiment. Further, in the high frequency range where the current instruction value I* is used for the calculation of the estimated current I_est, the open loop gain decreases to the same extent as the no magnetic coupling case or as the first embodiment. When the transfer function for correction is "G(s)=100/s," the open loop gain lowers at a low frequency lower than when the transfer function for correction is "G(s)=1000/s," and the open loop gain gets closer to the no magnetic coupling case or the first embodiment.

Figure 15:
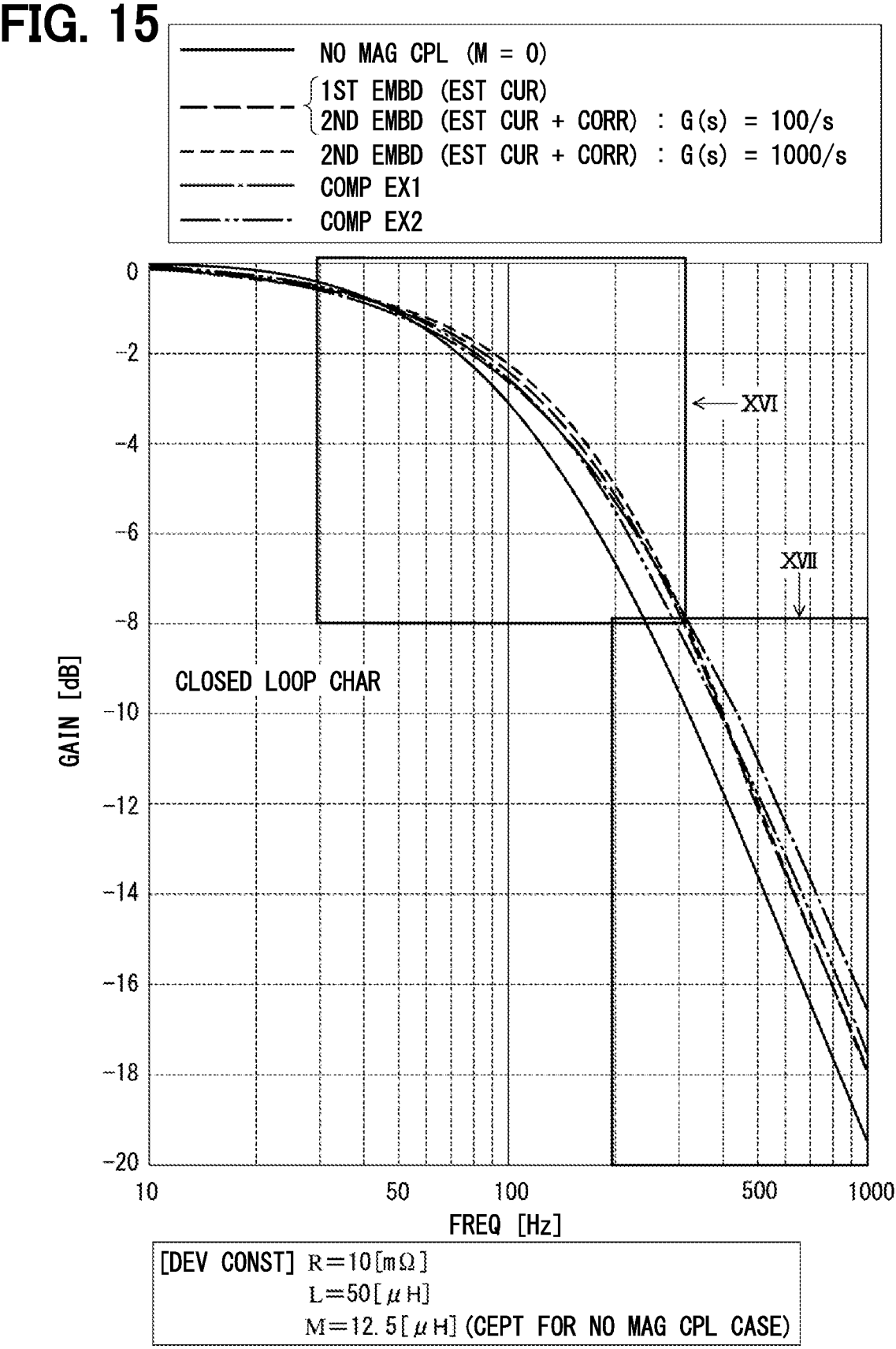
FIG. 15 is a frequency characteristic diagram of closed loop characteristics.
Figure 16:
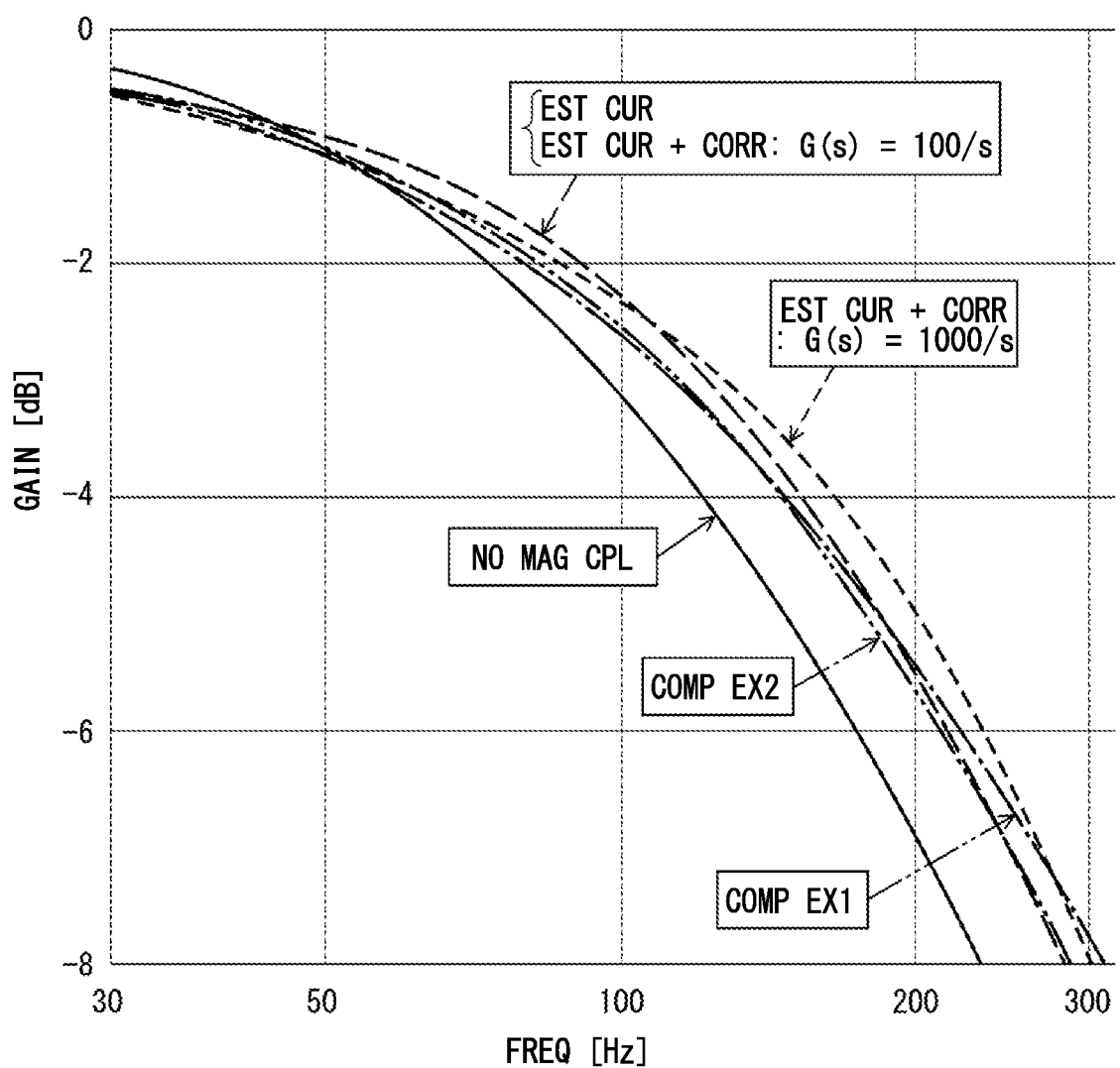
FIG. 16 is an enlarged view of a portion XVI in FIG. 15.
Figure 17:
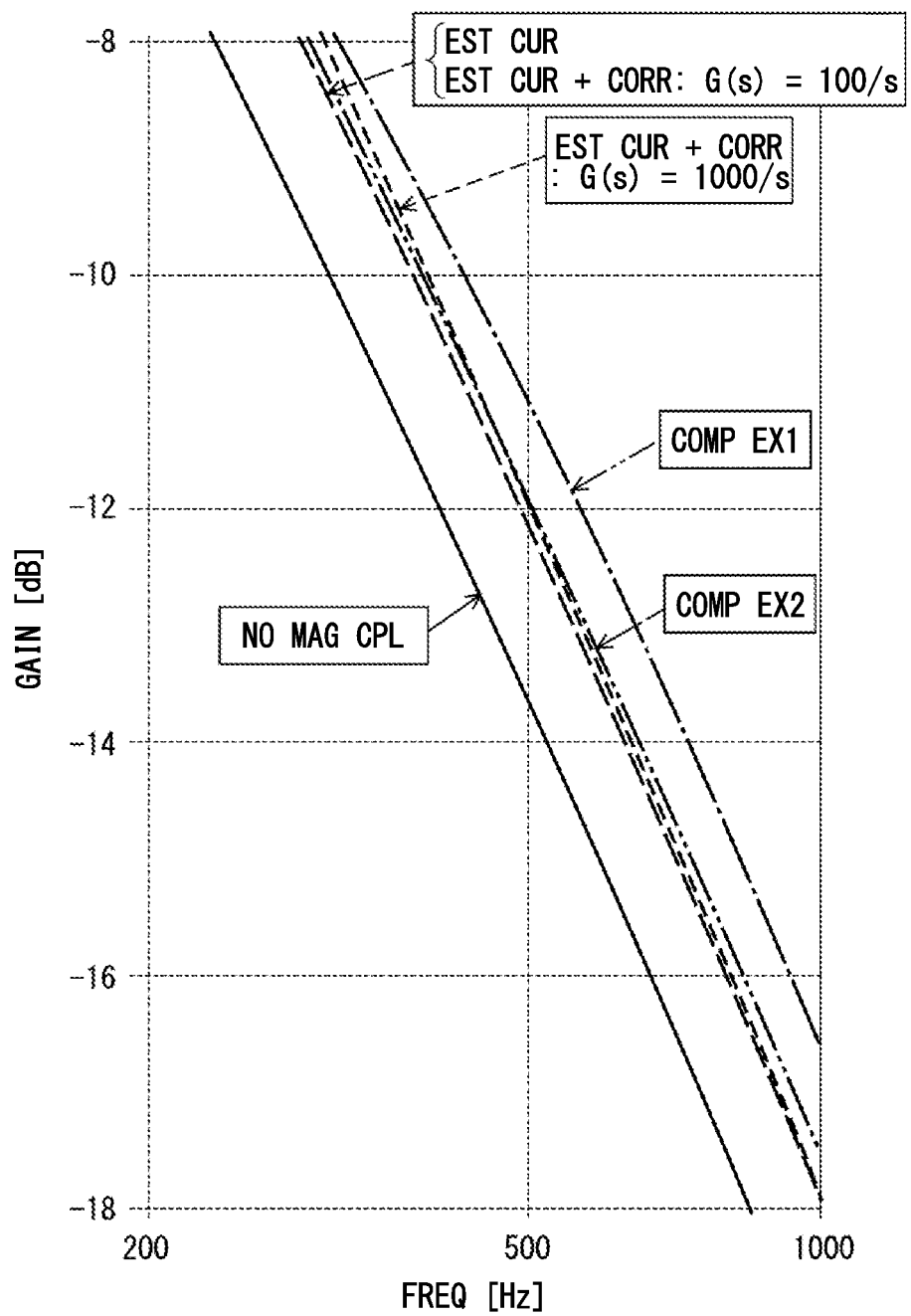
FIG. 17 is an enlarged view of a portion XVII in FIG. 15.

Next, the closed loop response characteristics are shown in FIGS. 15 to 17. When there is no magnetic coupling, the closed loop gain is the lowest as shown by the solid line. In the comparative example 1 indicated by the one-dot chain line and the comparative example 2 indicated by the alternate two-dot chain line, the closed loop gain in the high frequency range increases compared to the case without magnetic coupling. When the transfer function for correction is "G(s)=1000/s" in the second embodiment, the closed-loop gain is increased in the vicinity of 100 to 250 [Hz] as compared with the comparative examples 1 and 2 as indicated by the short broken line. When the estimated current I_est is used without correction, and when the transfer function for correcting the estimated current I_est is "G(s)=100/s," the closed loop gain increases at around 50 to 100 [Hz] as shown by the long broken line.

As described above, in the first and second embodiments in which the decoupling control is performed by using the corrected estimated current I_est or by using the estimated current without correction, while the lowness of the open-loop gain is maintained to the same extent as the case of no magnetic coupling, the closed loop response equivalent to or higher than that of the comparative examples 1 and 2 is achievable. In other words, in both of the first and second embodiments, highly stable and highly responsive characteristics are obtainable. However, in the first embodiment in which the estimated current I_est is not corrected, the estimated value may be shifted due to a change in the resistance due to a temperature rise of the motor winding or a variation in resistance of the motor winding. On the other hand, in the second embodiment, by correcting the estimated current I_est, the influence of temperature characteristics and variations is removable.

(Modification of Second Embodiment)

In the second embodiment, the estimated current I_est is corrected by using the actual current of the subject system in which the amount of information to be communicated is smaller. However, the actual current of the subject system may be replaced with the actual current of the other system. In other words, as indicated by broken line arrows in FIG. 11, the estimated current correction units Compd and Compq of the first system may correct the estimated currents Id1_est and Iq1_est based on the actual currents Id2 and Iq2 flowing in the three-phase windings 802 of the other system. With such a configuration, the above equations (2) to (5.1) and (5.2) are obtainable in the same manner, and the influence of temperature characteristics and variations can be eliminated.

Third Embodiment

Figure 18:
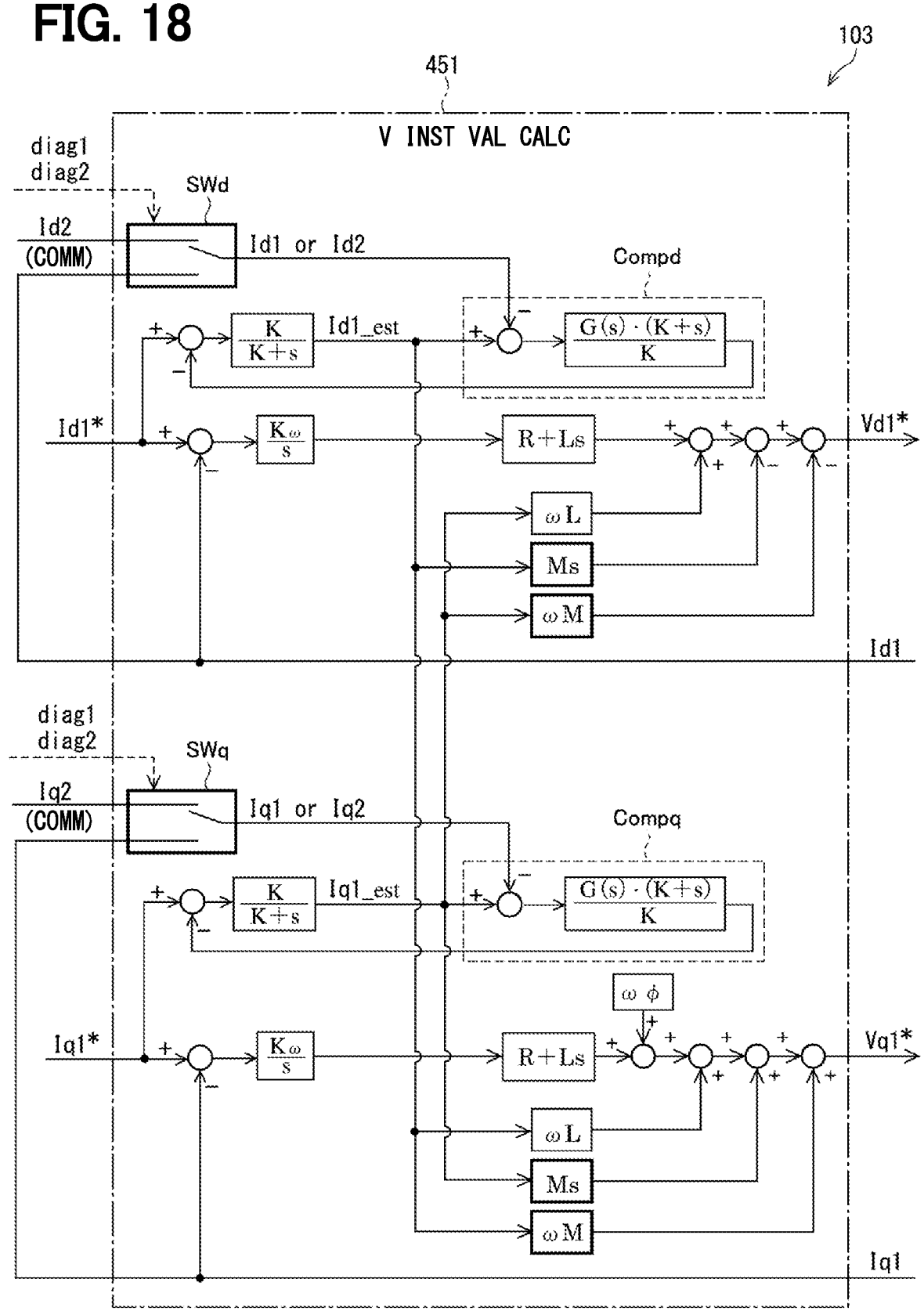
FIG. 18 is a block line diagram of signal transmission of a voltage instruction calculation unit according to a third embodiment.

Next, the third embodiment is described with reference to FIGS. 18 to 22. FIG. 18 shows a configuration of the voltage instruction value calculator 451 of the first system in an ECU 103 of the third embodiment. Further to the configuration of the second embodiment shown in FIG. 11, in the third embodiment, actual current switching units SWd and SWq for correction are provided for each of the d axis and q axis of the respective systems. The voltage instruction value calculator 452 of the second system is interpreted in the same manner by reversely replacing the last digits "1" and "2" of the symbol of the electric current in the description of the first system.

The microcomputers 401 and 402 of the respective systems bidirectionally transmit and receive the actual currents Id1, Iq1, Id2, and Iq2 flowing in the three-phase windings 801 and 802 of the respective systems via inter-system communication. Further, the microcomputers 401 and 402 of the respective systems transmit and receive the abnormality information of the respective systems bidirectionally. More specifically, when one of the systems is abnormal or when the communication is abnormal, the abnormal signals diag1 and diag2 generated by the fail-safe units 441 and 442 of the respective microcomputers 401 and 402 are notified to the voltage instruction value calculators 451 and 452 of the respective systems.

The d-axis actual current Id1 of the subject system and the d-axis actual current Id2 of the other system obtained via communication are input to the d-axis actual current switching unit SWd for correction in the first system. The d-axis actual current switching unit SWd for correction switches the actual currents Id1 and Id2 of the subject system or the other system as the d-axis actual current for correction input to the estimated current correction unit Compd according to the abnormal signals diag1 and diag2. The q-axis actual current Iq1 of the subject system and the q-axis actual current Iq2 of the other system obtained by communication are input to the q-axis actual current switching unit SWq for correction in the first system. The q-axis actual current switching unit SWq for correction switches the actual currents Iq1 and Iq2 of the subject system or the other system as the q-axis actual current for correction input to the estimated current correction unit Compq according to the abnormal signals diag1 and diag2.

Assuming that the subject system is normal, the actual current switching units SWd and SWq for correction of the respective axes correct the estimated currents Id1_est and Iq1_est based on the actual currents Id2 and Iq2 of the three-phase winding 802 of the other system when the other system is normal and the communication is normal. By using information of the other system, errors due to variations between the systems are reducible. On the other hand, the actual current switching units SWd and SWq for correction for each axis correct the estimated currents Id1_est and Iq1_est based on the actual currents Id1 and Iq1 of the three-phase winding 801 of the subject system when the other system is abnormal or the communication is abnormal. In such manner, a situation where the correction calculation of the estimated current I_est cannot be correctly performed is avoidable.

FIG. 19 shows a configuration example of a post-relay voltage monitor circuit that determines an operation abnormality of the subject system or the other system. Unlike the system configuration of FIG. 5, FIG. 19 shows a system configuration in which the two systems are connected in parallel to the same battery 11. Here, "post-relay voltage" means a voltage on the inverters 601 and 602 side with respect to power relays 121 and 122, that is, an input voltage of the inverters 601 and 602. When the power relays 121 and 122 are turned on and the voltage of the battery 11 is normally supplied to the inverters 601 and 602 of the respective systems, it is determined that the two system are operating normally.

The power relay 121 and a reverse connection prevention relay 141 are connected in series to the power line Lp1 leading to the input section of first system. Voltage dividing resistors Ru1 and Rd1 are connected to a position between the power relay 121 and the reverse connection prevention relay 141 on the power supply line Lp1 and between a ground line Lg1. A division voltage between the upper voltage dividing resistor Ru1 and the lower voltage dividing resistor Rd1 is obtained from a detection terminal by the first microcomputer 401 as Vr11 and is also obtained by the second microcomputer 402 as Vr21.

Similarly, the power relay 122 and a reverse connection prevention relay 142 are connected in series to the power line Lp2 leading to the input section of the second system. Voltage dividing resistors Ru2 and Rd2 are connected to a position between the power relay 122 and the reverse connection prevention relay 142 on the power supply line Lp2 and between a ground line Lg2. A division voltage between the upper voltage dividing resistor Ru2 and the lower voltage dividing resistor Rd2 is obtained from a detection terminal by the first microcomputer 401 as Vr12 and is also obtained by the second microcomputer 402 as Vr22.

In other words, among the two-digit numbers after "Vr" in the symbol the division voltage, the first digit means the system number of the microcomputer obtaining the division voltage information, and the second digit means the number of the detection target system. Thus, the microcomputers 401 and 402 of the respective systems mutually monitor the post-relay voltages of the subject system and the other system as a fail-safe function.

The power relays 121 and 122 provided on the battery 11 side have reflux diodes that allow the electric current to flow from the inverters 601 and 602 toward the battery 11. The reverse connection prevention relays 141 and 142 provided on the inverters 601 and 602 side have reflux diodes that allow the electric current from the battery 11 side toward the inverters 601 and 602. As is well known, the reverse connection prevention relays 141 and 142 block a reverse flow of the electric current from the battery 11 via the ground lines Lg1 and Lg2 in the reverse direction when the battery 11 is put/installed in the reverse direction.

Figure 20:
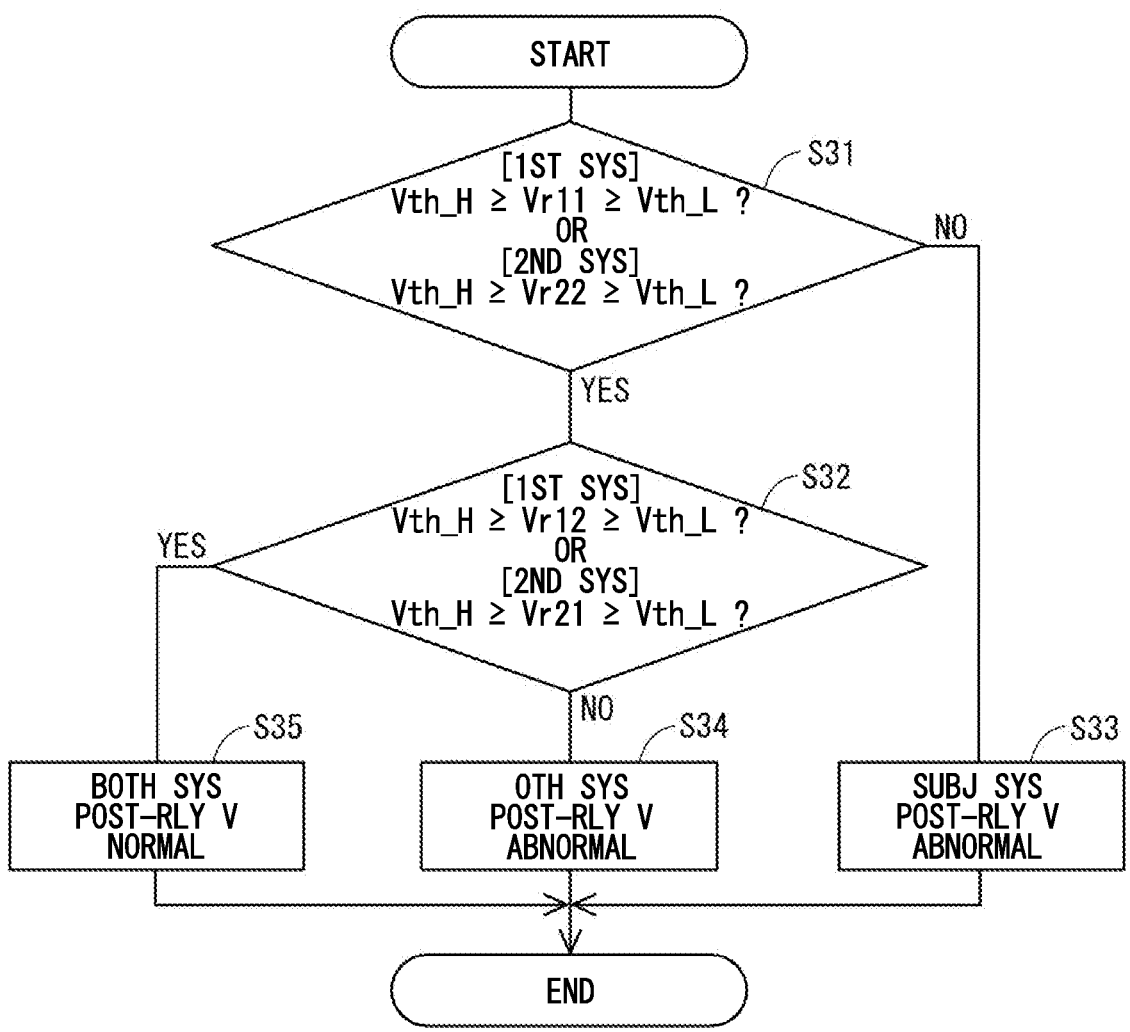
FIG. 20 is a flowchart of abnormality determination of a subject system and an other system based on an input voltage.

FIG. 20 shows a flowchart of a post-relay voltage abnormality determination process of the subject system and the other system by the voltage monitor circuit of FIG. 19. In the following flowchart, a symbol S indicates a step. In S31 and S32, determination steps by the first microcomputer 401 and the second microcomputer 402 are collectively described.

In S31, the first microcomputer 401 determines whether the division voltage Vr11 is equal to or greater than a lower limit threshold Vrth_L and equal to or less than an upper limit threshold Vrth_H regarding the division voltage Vr22. If YES is determined in S15, the process proceeds to S32. In case of NO determination in S31, then in S33, the first microcomputer 401 or the second microcomputer 402 determines that the post-relay voltage of the subject system is abnormal.

In S32, the first microcomputer 401 determines whether the division voltage Vr12 is equal to or greater than the lower limit threshold Vrth_L and equal to or less than the upper limit threshold Vrth_H regarding the division voltage Vr21. In case of NO determination in S32, then in S34, the first microcomputer 401 or the second microcomputer 402 determines that the post-relay voltage of the other system is abnormal. In case of YES determination in S32, the microcomputers 401 and 402 determine in S35 that the post-relay voltages of both systems are normal.

FIG. 21 shows other configuration example of the post-relay voltage monitor circuit. In the configuration example of FIG. 21, a reverse connection prevention relay 131 is connected to the ground line Lg1 of the first system. The first system voltage dividing resistors Ru1 and Rd1 are connected to a position between (i) the inverter 601 side of the power relay 121 on the power supply line Lp1 and (ii) the inverter 601 side of the power relay 131 on the ground line Lg1. Further, as shown with a broken line, the reverse connection prevention relay 141 on the power supply line Lp1 may or may not be present.

Similarly, a reverse connection prevention relay 132 is connected to the second system ground line Lg2. The second system voltage dividing resistors Ru2 and Rd2 are connected to a position between (i) the inverter 601 side of the power relay 122 on the power supply line Lp2 and (ii) the inverter 602 side of the power relay 132 on the ground line Lg2. As indicated by a broken line, the reverse connection prevention relay 142 on the power supply line Lp2 may or may not be provided. Even in the post-relay voltage monitor circuit having the configuration of FIG. 21, the same abnormality determination as that of the configuration of FIG. 19 is performable.

Further, in the post-relay voltage monitor circuit of FIG. 21, a resistor Rg-g is connected to a position between the ground lines Lg1 and Lg2 of the two systems. Under normal conditions, the ground-side detection terminals of the respective systems are connected to the ground line of the other system via the resistor Rg-g. Therefore, if the ground-side detection terminal has an open failure, the potential changes, thereby an open failure of the ground-side detection terminal is detectable based on the potential. Note that two resistors Rg-g between the grounds may be provided one by one in the vicinity of the respective systems as shown in parentheses in the drawing, or may be provided as only one piece.

Figure 22:
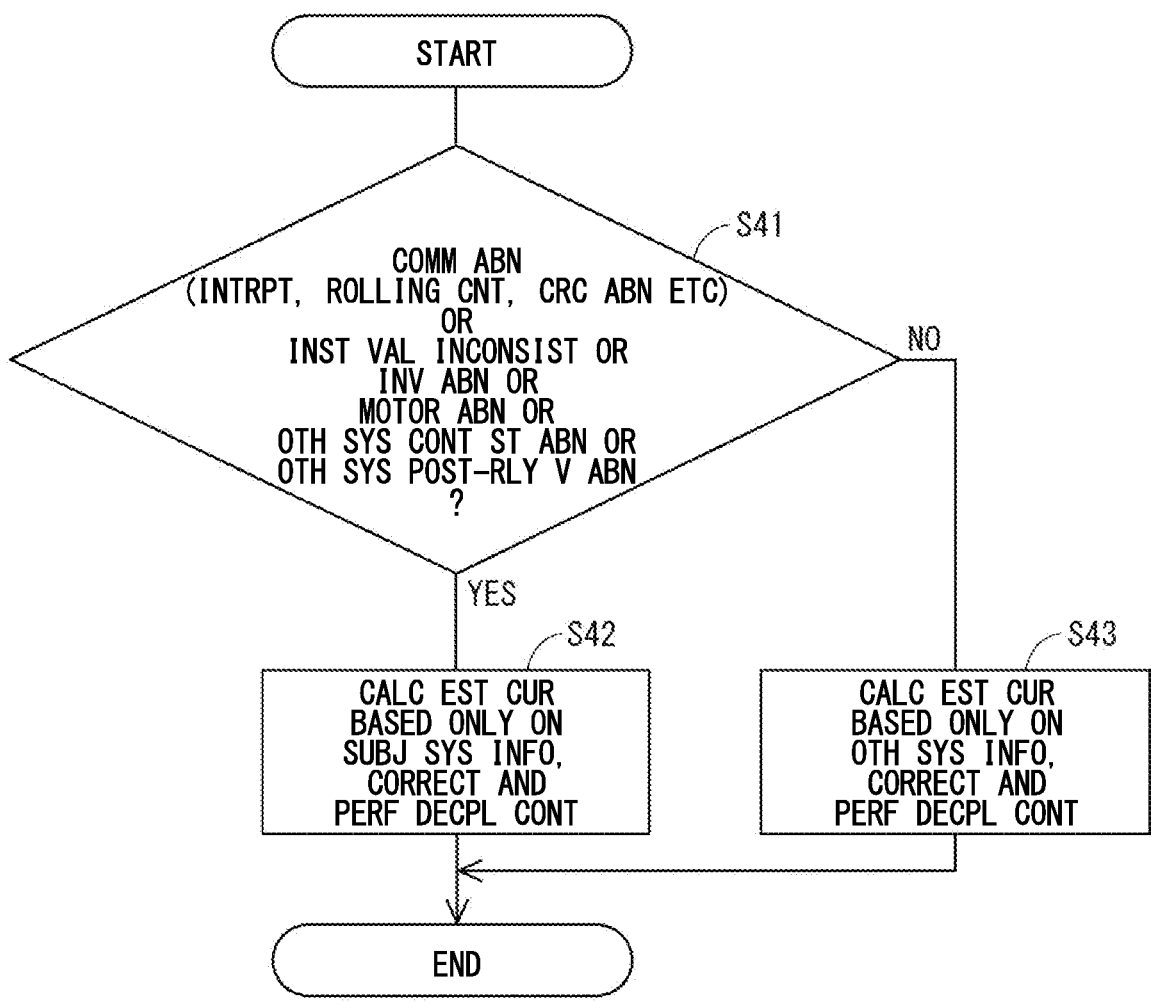
FIG. 22 is a flowchart of switching of information used for calculation of a decoupling control amount according to presence or absence of various abnormalities.

FIG. 22 shows a flowchart of a process for switching information used for calculation or correction of the estimated current I_est according to the presence or absence of an abnormal signal. The switching process of FIG. 22 includes the process shown in FIG. 8 of the first embodiment regarding the selection of the current instruction value I* used for the calculation of the estimated current I_est. Further, the process regarding switching of the actual current used for the correction of the estimated current I_est corresponds to the configuration of FIG. 18 of the third embodiment.

In S41, the fail-safe units 441 and 442 of the respective systems determine whether any one or more of the following abnormalities are detected. An example of a configuration for detecting a post-relay voltage abnormality is as described above. Other abnormalities can also be detected by known techniques as appropriate.

[1] Communication abnormality (disruption, rolling counter, CRC abnormality, etc.)
[2] Instruction value mismatch abnormality
[3] Inverter abnormality
[4] Motor abnormality
[5] Control state of the other system is abnormal
[6] Post-relay voltage of the other system is abnormal.

In case of YES determination in S41, the microcomputers 401 and 402 of the respective systems calculate or correct the estimated current I_est based on information of the subject system only and perform the decoupling control in S42. If NO determination is made in S41, the microcomputers 401 and 402 of the respective systems calculate or correct the estimated current I_est based on the information of the other system and perform the decoupling control in S43.

The third embodiment described above is configured to perform the decoupling control by calculating or correcting the estimated current I_est based on information of only the subject system when the other system is abnormal or when the communication is abnormal. Alternatively, a configuration in which the estimated current I_est is calculated or corrected based on information of only the subject system when the other system is normal and the communication is normal for performing the decoupling control may also be acceptable.

Other Embodiments (A) The embodiments described above assume a configuration in which two systems of microcomputers 401 and 402 are individually provided to communicate information with each other. However, further to the two microcomputers, the other arithmetic unit such as a monitor unit may also be additionally provided. Further, the torque sensor and the rotation angle sensor are not limited to the redundant configuration, but may be provided as one unit in common for (i.e., to be shared by) the two systems.

(B) The number of phases of the multi-phase rotating machine is not limited to three phases, but may be four or more phases. In a rotating machine other than the one with three phases, the "three-phase winding" in the above embodiments may be generalized to a "multi-phase winding." The control device of a multi-phase rotating machine of the present disclosure is not limited to a control device for a steering assist motor of an electric power steering apparatus, but may be applied as a control device for a motor or a generator for other purposes.

(C) Further to CAN and serial communication (UART), other standard such as LIN, FlexRay, Ethernet (registered trademark), or the like may be used as a communication standard for the inter-system communication.

The present disclosure should not be limited to the embodiments described above, and various other embodiments may be implemented without departing from the scope of the present disclosure.

Arithmetic/calculation units and relevant methods described in the present disclosure may be implemented/realized by programming a special purpose computer which is configured with a memory and a processor programmed to execute one or more particular functions embodied as computer programs. Alternatively, the arithmetic/calculation unit described in the present disclosure and the method thereof may be realized by a special purpose computer configured as a processor having one or more dedicated hardware logic circuits. Alternatively, the arithmetic/calculation unit and the method described in the present disclosure may be realized by one or more special purpose computers, which is a combination of (i) a programmable special purpose computer having a processor and a memory, which are programmed to perform one or more functions, and (ii) a hardware-logic special purpose computer having a processor with one or more hardware logic circuits. The computer programs may be stored, as instructions being performed by a computer, in a tangible, non-transitory computer-readable storage medium.

What is claimed is:

1. A control device of a multi-phase rotating machine (80) having two systems of components regarding energization to two systems of multi-phase windings for a drive thereof, the control device comprising:
    two systems of power converters capable of individually energizing the multi-phase windings in the two systems; and
    two systems of arithmetic units separately provided for controlling flow of electric current from the power converters to the multi-phase windings based on a detected current flowing in the multi-phase windings detected by current detectors, wherein
    the arithmetic units of the respective systems communicate at least one kind of information via inter-system communication at least in one direction,
    perform current control calculation of the electric current flowing in the multi-phase winding of a subject system in a cycle shorter than a communication cycle of the inter-system communication, and
    calculate, for a decoupling control, a decoupling control amount of the electric current flowing in the multi-phase windings of the subject system regarding a voltage generated in the multi-phase winding of the subject system by the electric current flowing in the multi-phase winding of an other system by using an estimated current that is calculated based on a current instruction value of the subject system or of the other system.

2. The control device according to claim 1, wherein
the estimated current is calculated by a current controller and a rotating machine model based on a current instruction value of the subject system or of the other system.

3. The control device according to claim 1, wherein
wherein the arithmetic unit of at least one system calculates the current instruction value based on an input signal, and transmits the current instruction value to the arithmetic unit of the other system.

4. The control device according to claim 1, wherein
the arithmetic units of the respective systems communicate at least abnormality information of the respective systems bidirectionally by the inter-system communication, and
calculate the estimated current,
based on an assumption that the subject system is normal, and based at least on the current instruction value calculated by the arithmetic unit of the subject system, or the current instruction value calculated by the arithmetic unit of the other system and obtained by the inter-system communication, and
calculate the estimated current based on the current instruction value calculated by the arithmetic unit of the subject system when the other system is abnormal or the communication is abnormal.

5. The control device for a multi-phase rotating machine according to claim 1, wherein
the arithmetic units of the respective systems correct the estimated current based on an actual current flowing in the multi-phase winding of the subject system.

6. The control device for a multi-phase rotating machine according to claim 1, wherein
the arithmetic units of the respective systems correct the estimated current based on an actual current flowing in the multi-phase windings of the other system.

7. The control device for a multi-phase rotating machine according to claim 1, wherein
the arithmetic units of the respective systems communicate an actual current flowing in the multi-phase windings of the respective systems and abnormality information of the respective systems bidirectionally by the inter-system communication, and
based on an assumption that the subject system is normal, correct the estimated current based on an actual current of the other system when the other system is normal and communication is normal, and
correct the estimated current based on the actual current of the subject system when the other system is abnormal or when the communication is abnormal.

8. The control device for a multi-phase rotating machine according to claim 3, wherein
the inter-system communication is performed via a vehicle network.

9. The control device for a multi-phase rotating machine according to claim 3, wherein
the inter-system communication is performed inside the control device.

10. A method for controlling a multi-phase rotating machine that reduces communication load in decoupling control by two systems of arithmetic units, the method comprising:
    calculating current control of an electric current flowing in a multi-phase winding of a subject system in a cycle shorter than a communication cycle of an inter-system communication, and
    calculating, for a decoupling control, a decoupling control amount of the electric current flowing in the multi-phase windings of the subject system regarding a voltage generated in the multi-phase winding of the subject system by the electric current flowing in the multi-phase winding of an other system by using an estimated current that is calculated based on a current instruction value of the subject system or of the other system.

11. The method according to claim 10, wherein
the estimated current is calculated by a current controller and a rotating machine model based on a current instruction value of the subject system or of the other system.

12. The method according to claim 10, wherein
the arithmetic unit of at least one system calculates the current instruction value based on an input signal, and transmits the current instruction value to the arithmetic unit of the other system.

* * * * *